United States Patent
Li et al.

(10) Patent No.: US 11,271,668 B2
(45) Date of Patent: Mar. 8, 2022

(54) DATA TRANSMISSION METHODS, APPARATUSES, DEVICES, AND SYSTEM

(71) Applicant: Huawei Technologies Co., Ltd., Shenzhen (CN)

(72) Inventors: Rixin Li, Shenzhen (CN); Zhigang Zhu, Shenzhen (CN); Min Zha, Shenzhen (CN); Haizhou Xiang, Beijing (CN); Yuchun Lu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 16/686,665

(22) Filed: Nov. 18, 2019

(65) Prior Publication Data
US 2020/0145119 A1 May 7, 2020

Related U.S. Application Data

(63) Continuation of application No. PCT/CN2018/086146, filed on May 9, 2018.

(30) Foreign Application Priority Data

May 19, 2017 (CN) .......................... 201710357163.9

(51) Int. Cl.
*H04J 3/16* (2006.01)
*H04L 45/50* (2022.01)
(Continued)

(52) U.S. Cl.
CPC .......... *H04J 3/1664* (2013.01); *H04L 45/502* (2013.01); *H04L 47/11* (2013.01);
(Continued)

(58) Field of Classification Search
CPC . H04J 2203/0085; H04J 3/1664; H04L 29/08; H04L 45/502; H04L 47/11; H04L 47/6275; H04L 61/6022
See application file for complete search history.

(56) References Cited

U.S. PATENT DOCUMENTS 7,002,911 B1 * 2/2006 Linville ................ H04L 49/50
370/230
7,492,714 B1 * 2/2009 Liao ..................... H04L 12/4604
370/235
(Continued)

FOREIGN PATENT DOCUMENTS

CN 105122763 A 12/2015
CN 106612203 A 5/2017
(Continued)

OTHER PUBLICATIONS

He et al., "Using Flexible Ethernet to Build a Flexible Network", Feb. 19, 2019, IEEE, Feb. 16-19, 2014 ICACT2014, pp. 872-875, Total pp. 4 (Year: 2014).*
(Continued)

*Primary Examiner* — Shah M Rahman
(74) *Attorney, Agent, or Firm* — Conley Rose, P.C.

(57) ABSTRACT

A data transmission apparatus, a data transmission system, and a data transmission method for implementing flexible Ethernet (FlexE) data transmission in an upstream/downstream asymmetric manner includes obtaining a plurality of first data packets that come from different Media Access Control (MAC) clients, where the different MAC clients receive respective second data packets over respective second FlexE virtual links; and sending the plurality of first data packets to a transmit end of the second data packets over a first FlexE virtual link that corresponds to the different MAC clients.

20 Claims, 17 Drawing Sheets

Obtain a plurality of first data packets that come from different Media Access Control MAC clients, where the different MAC clients receive respective second data packets by using respective second flexible Ethernet FlexE virtual links — 1001

Send the plurality of first data packets to a transmit end of the second data packets by using a first FlexE virtual link that corresponds to the different MAC clients — 1002

(51) Int. Cl.
*H04L 47/11* (2022.01)
*H04L 47/6275* (2022.01)
*H04L 101/622* (2022.01)

(52) U.S. Cl.
CPC ...... *H04L 47/6275* (2013.01); *H04L 61/6022* (2013.01); *H04J 2203/0085* (2013.01)

(56) References Cited

U.S. PATENT DOCUMENTS

| | | | |
|---|---|---|---|
| 9,036,643 B2 * | 5/2015 | Kadambi | H04L 47/266 370/395.2 |
| 2003/0123393 A1 * | 7/2003 | Feuerstraeter | H04L 47/10 370/235 |
| 2005/0174941 A1 * | 8/2005 | Shanley | H04L 47/13 370/235 |
| 2015/0023158 A1 * | 1/2015 | Wu | H04L 47/17 370/229 |
| 2015/0055664 A1 * | 2/2015 | Kanonakis | H04Q 11/00 370/535 |
| 2016/0119075 A1 * | 4/2016 | Gareau | H04B 10/27 398/58 |
| 2016/0119076 A1 * | 4/2016 | Gareau | H04Q 11/0066 398/49 |
| 2016/0323164 A1 | 11/2016 | Cao | |
| 2017/0005742 A1 * | 1/2017 | Gareau | H04L 25/49 |
| 2017/0005901 A1 * | 1/2017 | Gareau | H04L 43/10 |
| 2017/0005949 A1 * | 1/2017 | Gareau | H04L 12/413 |
| 2017/0201323 A1 * | 7/2017 | Prakash | H04Q 11/0001 |
| 2018/0013511 A1 * | 1/2018 | Hussain | H04J 14/0205 |
| 2018/0102834 A1 * | 4/2018 | Ibach | H04B 10/03 |
| 2019/0349311 A1 * | 11/2019 | Ji | H04L 47/32 |

FOREIGN PATENT DOCUMENTS

| | | | |
|---|---|---|---|
| CN | 106803814 A | * | 6/2017 |
| EP | 3113502 A1 | | 1/2017 |
| WO | WO-2017156987 A1 | * | 9/2017 |

OTHER PUBLICATIONS

Jinno et al., "Elastic Optical Networking: Roles and Benefits in Beyond 100-GB/s Era", Mar. 2017, IEEE, Journal of Lightwave Technology, vol. 35, No. 5, Mar. 1, 2017, pp. 1116-1124, Total pp. 9 (Year: 2017).*
Optical Internetworking Forum, "Flex Ethernet Implementation Agreement", Mar. 2016, Optical Internetworking Forum, www.oiforum.com, pp. 1-31, Total pp. 31 (Year: 2016).*
Cisco, "Priority Flow Control: Build Reliable Layer 2 Infrastructure", Jun. 2015, Cisco White Paper, <https://www.cisco.com/c/en/us/products/collateral/switches/nexus-7000-series-switches/white_paper_c11-542809.pdf>, Total pp. 8 (Year: 2015).*
Machine Translation and Abstract of Chinese Publication No. CN106612203, dated May 3, 2017, 20 pages.
Foreign Communication from a Counterpart Application, PCT Application No. PCT/CN2018/086146, English Translation of International Search Report dated Jul. 23, 2018, 2 pages.
Foreign Communication from a Counterpart Application, PCT Application No. PCT/CN2018/086146, English Translation of Written Opinion dated Jul. 23, 2018, 3 pages.

* cited by examiner

DATA TRANSMISSION METHODS, APPARATUSES, DEVICES, AND SYSTEM

CROSS-REFERENCE TO RELATED APPLICATIONS

This application is a continuation application of International Patent Application No. PCT/CN2018/086146, filed on May 9, 2018, which claims priority to Chinese Patent Application No. 201710357163.9, filed on May 19, 2017. The disclosures of the aforementioned applications are hereby incorporated by reference in their entireties.

TECHNICAL FIELD

This application relates to the field of flexible Ethernet technologies, and in particular, to two data transmission methods, apparatuses, and devices, and a data transmission system.

BACKGROUND

Ethernet is a baseband local area network (LAN) specification, and is currently the most common communications protocol standard used by existing local area networks. By now, development of Ethernet roughly undergoes the following three stages such as native Ethernet, carrier Ethernet, and flexible Ethernet (FlexE). Facing the future, FlexE becomes a key direction of future network development, and FlexE based on slicing technologies becomes a future trend.

FlexE is used to create a physical connection group (FlexE Group) is created using several Ethernet physical layer apparatuses (physical layer device or PHY), and provide a generic mechanism that supports different Ethernet Media Access Control (MAC) rates, so as to support functions such as bonding, sub-rating, and channelization of an Ethernet service. A MAC rate provided by FlexE may be greater than a rate of a single PHY (through bonding), or may be less than a rate of a single PHY (through sub-rating and channelization).

Currently, as a next-generation Ethernet interface technology, FlexE mainly uses upstream/downstream symmetric links to transmit upstream data and downstream data. However, in a current network, a large quantity of asymmetric traffic scenarios exist, including a digital subscriber line (DSL), a passive optical network (PON), and the like. As shown in FIG. 1, a typical upstream/downstream asymmetric scenario is a video application scenario, in which a data center server generates a large amount of downstream video traffic, but receives only a small amount of data and control traffic. A similar scenario is also found in an access network. With the popularity of applications such as an augmented reality (AR) technology, a virtual reality (VR) technology, and online high-definition video, a trend of asymmetric traffic becomes more apparent in a future big video era.

In conclusion, some approaches of FlexE upstream data transmission have a problem that a relatively large quantity of bandwidth resources are occupied. Therefore, a FlexE upstream data transmission solution would be well received to properly use bandwidth resources during FlexE upstream data transmission.

SUMMARY

This specification describes two data transmission methods, apparatuses, and devices, and a data transmission system, so as to properly use bandwidth resources during FlexE upstream data transmission.

According to an aspect, an embodiment of this application provides a data transmission method. A data transmission device (such as a switch or a router) includes at least one MAC client. The data transmission device obtains a plurality of first data packets, that is, upstream data that is to be transferred to a peer device (such as a switch or a router), where the plurality of first data packets may be a plurality of first data packets that come from different MAC clients. The different MAC clients receive respective second data packets over respective second FlexE virtual links, where the second data packet is downstream data that is transferred by the peer device to the data transmission device. After obtaining the plurality of first data packets, the data transmission device sends the plurality of first data packets to the peer device over a first FlexE virtual link that corresponds to the different MAC clients. By using the solution provided in this embodiment of this application, FlexE data transmission in an upstream/downstream asymmetric manner can be implemented. When transmitting the downstream data, MAC clients in a transmit end device of the downstream data transmit data to a receive end device of the downstream data over respective second virtual links, so that virtual connection transmission rates corresponding to the different MAC clients can be flexibly adjusted. When transmitting the upstream data, MAC clients in a transmit end device of the upstream data correspond to the same first virtual link, so that the different MAC clients can multiplex the first virtual link to transmit the upstream data. Therefore, bandwidth resources of an upstream link can be saved, bandwidth resources can be properly used during FlexE upstream data transmission, so that physical medium costs can be reduced.

In a possible design, the MAC clients in the transmit end of the upstream data correspond to the same first virtual link. In such a processing manner, all the MAC clients multiplex the same first virtual link, and therefore bandwidth resources can be saved to the maximum extent.

In a possible design, different parts of MAC clients in the transmit end of the upstream data correspond to different first virtual links. For example, MAC clients 1, 2, and 3 correspond to a first virtual link 1, and MAC clients 4, 5, and 6 correspond to a first virtual link 2.

In a possible design, some MAC clients in the transmit end of the upstream data may correspond to their respective dedicated first virtual links, and some MAC clients multiplex one first virtual link. For example, a MAC client 1 sends the upstream data over its dedicated first virtual link 1, and MAC clients 2 to 6 correspond to a first virtual link 2. In such a processing manner, some MAC clients use an upstream/downstream symmetric manner to transmit data, and some MAC clients use an upstream/downstream asymmetric manner to transmit data. Therefore, personalized bandwidth requirements of some MAC clients can be met; in addition, bandwidth resources of an upstream link can be saved, and physical medium costs can be reduced as much as possible.

In a possible design, the method further includes determining the first virtual link based on first identification information of a MAC client that is carried in the first data packet, and a correspondence between a MAC client identifier and a virtual link identifier. In such a processing manner, a dedicated first virtual link of a MAC client, or a first virtual link shared by a MAC client and another MAC client can be determined for the MAC client.

In a possible design, the first identification information includes but is not limited to an identifier of a service flow to which the first data packet belongs, an Internet Protocol (IP) address, a Multiprotocol Label Switching (MPLS) identifier, or the like; or includes a compound identifier formed by combining the foregoing plurality of single identifiers.

In a possible design, when detecting that a physical port that is configured to receive the downstream data (that is, the second data packet) is congested, the data transmission device generates respective flow control frames, which are also referred to as MAC control frames, for MAC clients that receive the downstream data through the physical port, and sends the flow control frames to the transmit end of the downstream data over the first virtual link shared by the different MAC clients. In such a processing manner, the transmit end of the downstream data can be notified that the data receiving port is congested, so that the transmit end suspends sending of the downstream data. Therefore, a frame loss can be effectively prevented in the case of port congestion, ensuring efficient and stable running of a user network.

In a possible design, the flow control frame includes a PAUSE frame or a Priority-based Flow Control (PFC) frame. When PFC is not enabled for a priority of the downstream data, a PAUSE frame is generated, to stop all traffic on a virtual link; or when PFC is enabled for a priority of the downstream data, a PFC frame is generated, to separately suspend a virtual channel on a virtual link, while allowing traffic on another virtual channel to pass without interruption. Whether PFC is enabled for priorities of downstream data received by the different MAC clients may be different. For example, PFC is enabled for a priority of downstream data received by a MAC client 1, while PFC is not enabled for a priority of downstream data received by a MAC client 2. Therefore, flow control frames generated for the different MAC clients may not be the same, of which some are PAUSE frames, and the others are PFC frames.

In a possible design, before the flow control frames are sent to the receive end of the upstream data over the first virtual link shared by the different MAC clients, the method further includes obtaining, for each flow control frame, second identification information that is used to differentiate a MAC client corresponding to the flow control frame; and writing the second identification information into the corresponding flow control frame. In such a processing manner, the flow control frame has identification information that can be used to differentiate the MAC client to which the flow control frame belongs, the receive end of the upstream data can determine a control object of the flow control frame based on the identification information, and send the flow control frame to a corresponding MAC client, avoiding sending the flow control frame to all the MAC clients. Therefore, precision of flow control can be effectively ensured.

In a possible design, the second identification information includes an identifier (MAC control ID) of a flow control apparatus that is configured to generate the flow control frame. The flow control apparatus may be differentiated based on the corresponding MAC client, or may be differentiated based on another user-defined manner. For example, assuming that the MAC client is differentiated based on a port (such as a port 80 or a port 8080), the identifier of the flow control apparatus may be differentiated based on the port. The MAC control ID is a port number, and the port number may be obtained in a static configuration manner. Alternatively, a device stores a mapping mechanism between a MAC client and a flow control apparatus, and a one-to-one correspondence with the flow control apparatus may be found from the MAC client based on the mapping mechanism; or the MAC control ID may be obtained by using a static configuration method.

According to another aspect, an embodiment of this application provides a data transmission device, including a corresponding module that is configured to perform behavior of the data transmission device in the foregoing method designs. The module may be software and/or hardware.

In a possible design, the data transmission device includes a processor and a memory. The processor is configured to support the data transmission device to perform a corresponding function in the foregoing data transmission method. The memory is configured to be coupled to the processor, and stores a program instruction and data for the data transmission device.

In a possible design, the data transmission device includes a router or a switch.

According to still another aspect, an embodiment of this application provides a data transmission apparatus, including a first data packet obtaining unit configured to obtain a plurality of first data packets that come from different MAC clients, where the different MAC clients receive respective second data packets over respective second FlexE virtual links; and a first data packet sending unit, configured to send the plurality of first data packets to a transmit end of the second data packets over a first FlexE virtual link that corresponds to the different MAC clients.

According to yet another aspect, an embodiment of this application provides another data transmission method. A data transmission device that uses this method includes at least one MAC client. The data transmission device is a receive end device of a first data packet (upstream data), and different MAC clients in the data transmission device transmit second data packets (downstream data) to a transmit end of the first data packet over respective second FlexE virtual links. The data transmission device receives, over a first FlexE virtual link that corresponds to the different MAC clients, first data packets respectively corresponding to the different MAC clients, and distributes the first data packets to the corresponding MAC clients based on first identification information of the corresponding MAC clients that is carried in the first data packets.

In a possible design, all the MAC clients in the data transmission device correspond to the same first virtual link, and the data transmission device receives the upstream data over the shared first virtual link. In such a processing manner, all the MAC clients multiplex the same first virtual link, and therefore bandwidth resources can be saved to the maximum extent.

In a possible design, different parts of MAC clients in the data transmission device correspond to different first virtual links. For example, MAC clients 1, 2, and 3 correspond to a first virtual link 1, and MAC clients 4, 5, and 6 correspond to a first virtual link 2.

In a possible design, some MAC clients in the data transmission device may respectively correspond to their dedicated first virtual links, and receive the upstream data over their respective dedicated first virtual links; some MAC clients multiplex one first virtual link, and receive the upstream data over the shared first virtual link. For example, a MAC client 1 receives upstream data for this MAC client over its dedicated first virtual link 1, while MAC clients 2 to 6 correspond to the first virtual link 2. In such a processing manner, some MAC clients use an upstream/downstream symmetric manner to transmit data, and some MAC clients use an upstream/downstream asymmetric manner to transmit data. Therefore, personalized bandwidth requirements of some MAC clients can be met. In addition, bandwidth resources of an upstream link can be saved, and physical medium costs can be reduced as much as possible.

In a possible design, the first identification information includes, but is not limited to, an identifier of a service flow to which the first data packet belongs, an IP address, or a MPLS identifier, or includes a compound identifier formed by combining the foregoing plurality of single identifiers.

In a possible design, the data transmission device may further receive a flow control frame over the first virtual link, and obtain second identification information that is included in the flow control frame and that is used to differentiate a MAC client corresponding to the control frame, and then distribute, based on the second identification information, the flow control frame to a flow control apparatus of the MAC client that corresponds to the flow control frame. The flow control apparatus suspends, based on the control frame, sending of the second data packet by the corresponding MAC client. In such a processing manner, the flow control frame can be precisely sent to the flow control apparatus of the MAC client that corresponds to the flow control frame, rather than to respective flow control apparatuses of all the MAC clients, thereby avoiding a problem that all MAC clients of a corresponding physical connection suspend sending of the second data packet. Therefore, network traffic of the MAC clients can be precisely controlled.

In a possible design, before distributing the flow control frame to the flow control apparatus corresponding to the corresponding MAC client, the data transmission device may further restore a value of a field occupied by the second identification information in the flow control frame to a preset default value. For example, the default value is all zeros.

In a possible design, the flow control frame includes a PAUSE frame or a PFC frame. When PFC is not enabled for a priority of the downstream data, the flow control frame is a PAUSE frame; or when PFC is enabled for a priority of the downstream data, the flow control frame is a PFC frame. Flow control frames corresponding to the different MAC clients may be different. For example, a flow control frame corresponding to a MAC client 1 is a PFC frame, while a flow control frame corresponding to a MAC client 2 is a PAUSE frame.

In a possible design, the second identification information includes an identifier of a flow control apparatus that is configured to generate the flow control frame. The identifier of the flow control apparatus may be differentiated based on the MAC client, or may be differentiated based on another user-defined manner. For example, assuming that the MAC client is differentiated based on a port, the identifier of the flow control apparatus may be differentiated based on the port. The identifier of the flow control apparatus is a port number, and the port number may be obtained in a static configuration manner. Alternatively, a device stores a mapping mechanism between a MAC client and a flow control apparatus, and a one-to-one correspondence with the flow control apparatus may be found from the MAC client based on the mapping mechanism; or the identifier of the flow control apparatus may be obtained by using a static configuration method. On the side of the data transmission device that receives the upstream data and on the side of the data transmission device that sends the upstream data, flow control apparatuses of the same MAC client may have the same second identification information.

According to still yet another aspect, an embodiment of this application provides a data transmission device, including a corresponding module that is configured to perform behavior of the data transmission device in the foregoing data transmission method designs for receiving a first data packet. The module may be software and/or hardware.

In a possible design, the data transmission device includes a processor and a memory. The processor is configured to support the data transmission device to perform a corresponding function in the foregoing data transmission method. The memory is configured to be coupled to the processor, and stores a program instruction and data for the data transmission device.

In a possible design, the data transmission device includes a router or a switch.

According to a further aspect, an embodiment of this application provides a data transmission apparatus, including a first data packet receiving unit, configured to receive, over a first FlexE virtual link that corresponds to different MAC clients, first data packets respectively corresponding to the different MAC clients; and a first data packet distribution unit, configured to distribute the first data packets to the corresponding MAC clients based on first identification information of the corresponding MAC clients that is carried in the first data packets.

According to a still further aspect, an embodiment of this application provides a data transmission system. The system includes the data transmission device for sending a first data packet according to the foregoing aspect, which is used as a first data transmission device; the data transmission device for receiving a first data packet according to the foregoing aspect, which is used as a second data transmission device; and at least one physical medium configured to connect the first data transmission device and the second data transmission device.

In a possible design, the physical medium includes an optical fiber.

In a possible design, an upstream data sending port on the first data transmission device is connected to an upstream data receiving port on the second data transmission device by using one physical medium. In such a processing manner, all the MAC clients multiplex a same physical link, and therefore physical medium costs can be reduced to the maximum extent.

According to a yet further aspect, an embodiment of this application provides a computer-readable storage medium, where the computer-readable storage medium stores an instruction, and when the instruction runs on a computer, the computer performs the methods according to the foregoing aspects.

According to still yet further aspect, an embodiment of this application provides a computer program product including an instruction, where when the instruction runs on a computer, the computer performs the methods according to the foregoing aspects.

Compared with some approaches, the solutions provided in this application can support upstream/downstream asymmetric FlexE data transmission, so that bandwidth resources of an upstream link can be saved, and physical medium costs can be reduced.

DESCRIPTION OF EMBODIMENTS

To help understand technical solutions of this application, the following first briefly describes concepts and technologies related to this application.

As a service interface, 802.3-based Ethernet defined by the Institute of Electrical and Electronics Engineers (IEEE) is applied to various scenarios and achieves a huge success. However, as technologies further develop, a difference between bandwidth granularities becomes larger, and an excessive deviation from an actual application requirement expectation is more easily caused. Bandwidth for a mainstream application may not belong to any Ethernet standard rate. For example, resources are wasted if service data of 50 gigabits per seconds (Gbps) is transmitted through a 100 Gigabyte Ethernet (GE) interface, and currently, no corresponding Ethernet standard granularity can carry 200-Gbps service data. People expect a flexible-bandwidth port (virtual connection) that can share one or several Ethernet physical interfaces. For example, two 40GE ports and two 10GE ports share a 100 Gigabyte (G) physical interface. A concept of FlexE is proposed in the Flex Ethernet Implementation Agreement technical proposal published by the Optical Internetworking Forum (OIF) in April 2016. Further, a FlexE Group is created with a plurality of Ethernet physical layer apparatuses, and a generic mechanism that supports different Ethernet MAC rates is provided, so as to support functions such as bonding, sub-rating, and channelization of an Ethernet service. A MAC rate provided by FlexE may be greater than a rate of a single PHY (through bonding), or may be less than a rate of a single PHY (through sub-rating and channelization).

Figure 1:
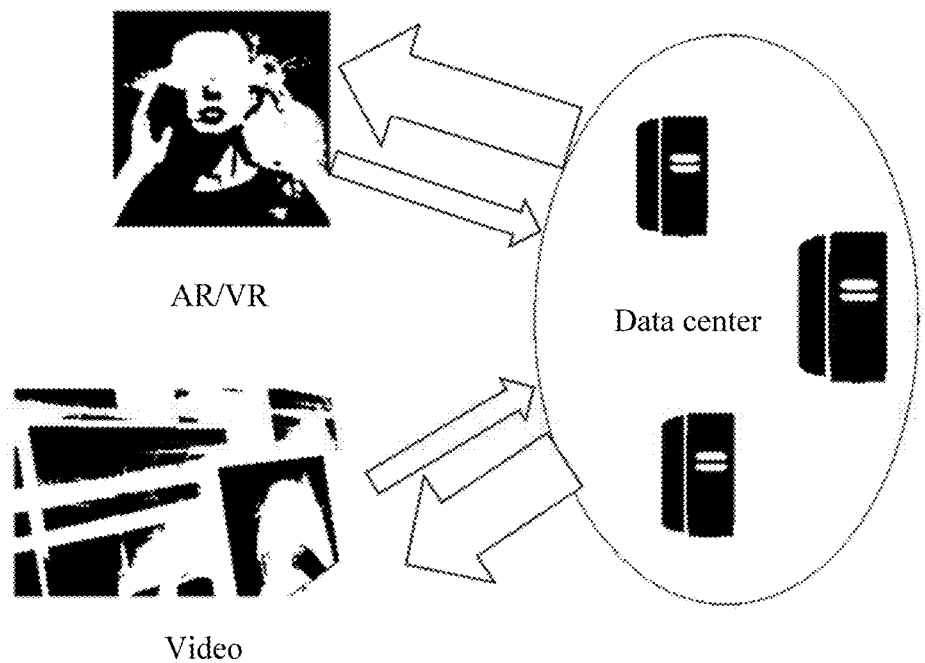
FIG. 1 is a schematic diagram of an upstream/downstream asymmetric traffic scenario.
Figure 2:
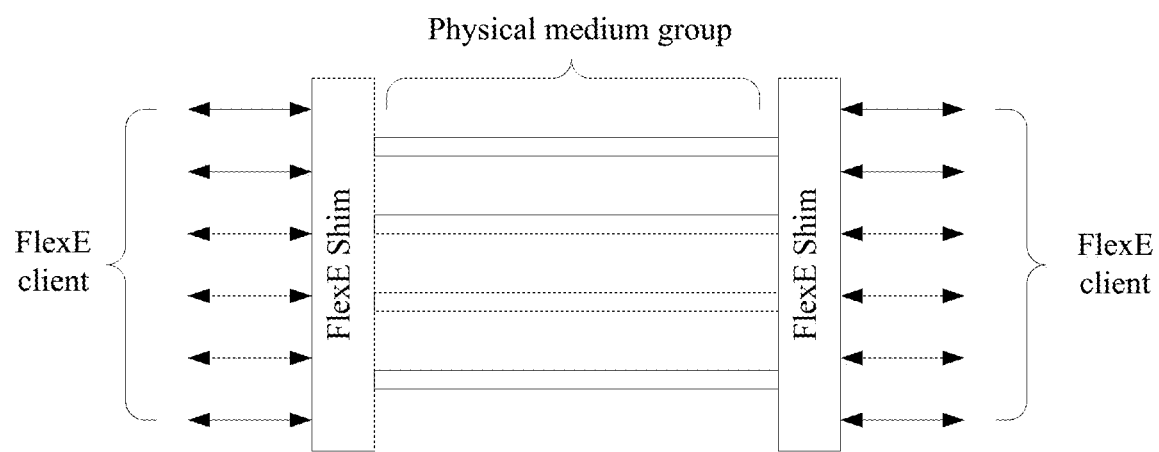
FIG. 2 is a schematic diagram of a FlexE architecture in some approaches.

An architecture of FlexE is shown in FIG. 2. For example, a bonding scenario of an Ethernet service can support transfer of a 200G Ethernet service (MAC bit stream) over two existing 100GE physical medium dependent (PMD) sublayers. A sub-rating application scenario of an Ethernet service can support transfer of a 50G Ethernet service over one existing 100GE PMD. Further, a channelization scenario of an Ethernet service can support several logical ports to share one or more physical interfaces, and can support transfer of one 150G Ethernet service and two 25G Ethernet services over two existing 100GE PMDs.

It may be learned from FIG. 2 that, the FlexE Group is formed by bonding 1 to n Ethernet PHYs. At least one PHY is bonded. The current OIF technical proposal supports only 100GBASE-R PHYs, and after a 400GE standard is improved in the IEEE P802.3bs in the future, a FlexE PHY supports a 400G PHY. A FlexE client (FlexE client) is an Ethernet data flow based on MAC, and a rate of the FlexE client may be the same as or different from an existing Ethernet PHY rate, for example, may be 10 Gbps, 40 Gbps, and m*25 Gbps. A FlexE Shim is a logical layer used to map FlexE client data to a FlexE Group, and demap FlexE Group data to a FlexE client. Similar to an Multi-link Gearbox (MLG) technology, the FlexE Shim performs a multiplexing function in the transmit direction and maps data from the FlexE client to the FlexE Group, and inversely, performs a demultiplexing function in the receive direction and demaps data from the FlexE Group to the FlexE client.

Figure 3:
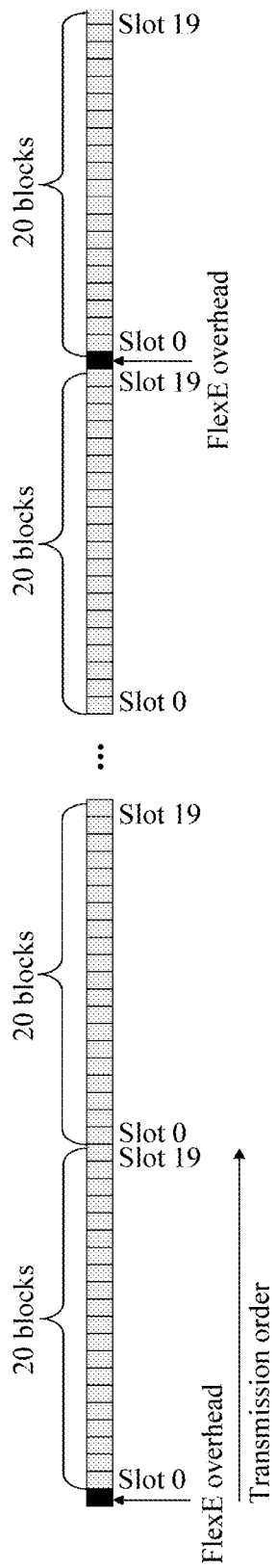
FIG. 3 is a schematic diagram of a position of a FlexE overhead on a single PHY in a FlexE Group in some approaches.

With reference to a synchronous digital hierarchy (SDH)/optical transport network (OTN) technology, FlexE builds a fixed frame format for physical interface transmission, and performs time division multiplexing (TDM) slot division. Different from SDH/OTN, a TDM slot division granularity of FlexE is 66 bits (66B), and slots are interleaved on the basis of 66B, which can exactly carry a 64 bit/66 bit (64B/66B) code block. As shown in FIG. 3, alignment of data on each PHY of FlexE is implemented by periodically inserting a code block of a FlexE overhead. Further, one 66B overhead code block is inserted every 1023*20 66B payload code blocks. Therefore, corresponding to a 100GBASE-R PHY scenario, an adjacent FlexE overhead code block appears once at a time interval of 13.1 μs.

Figure 4A:
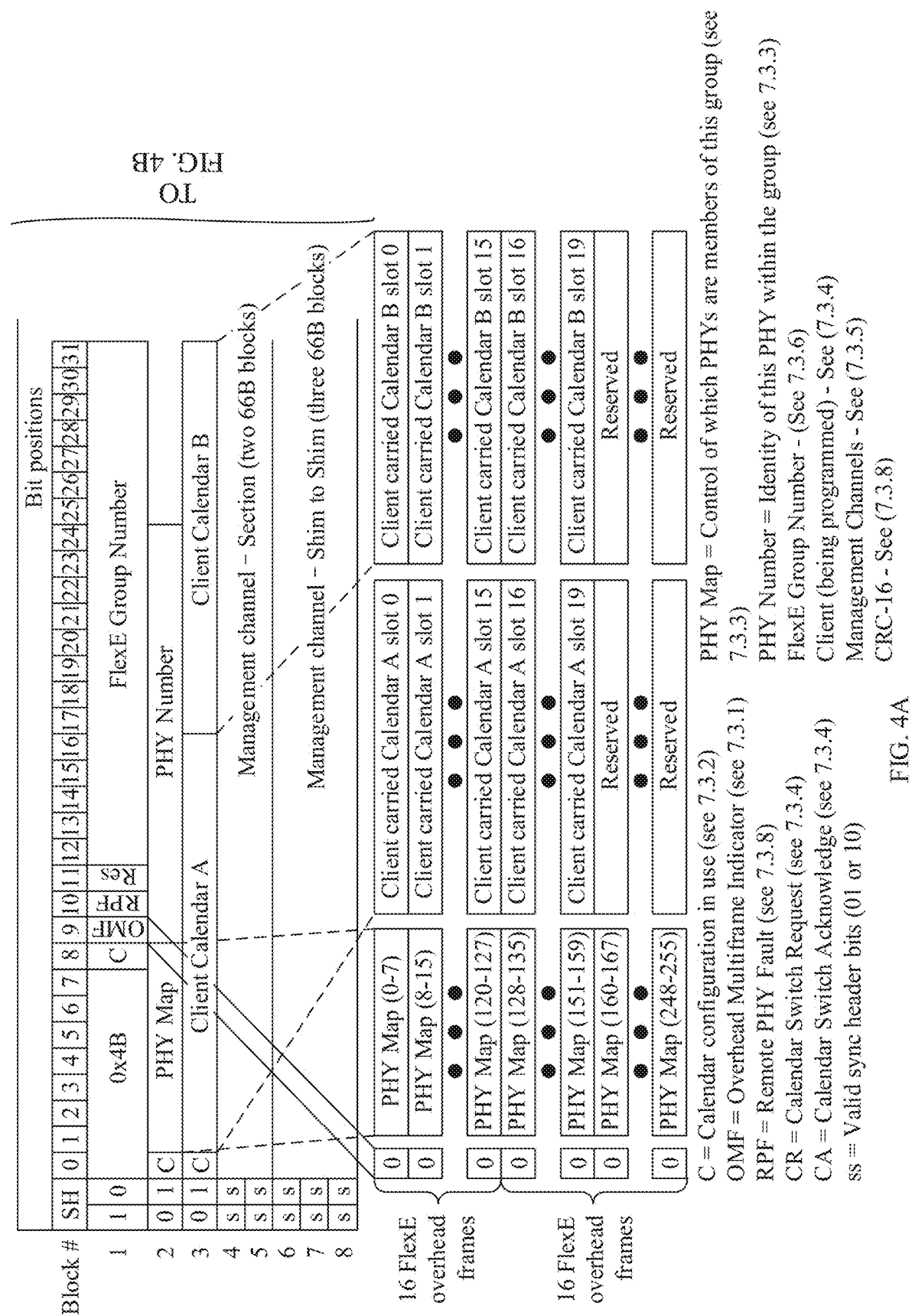
FIGS. 4A and 4B are schematic diagrams of a frame structure of a FlexE overhead in some approaches.
Figure 4B:
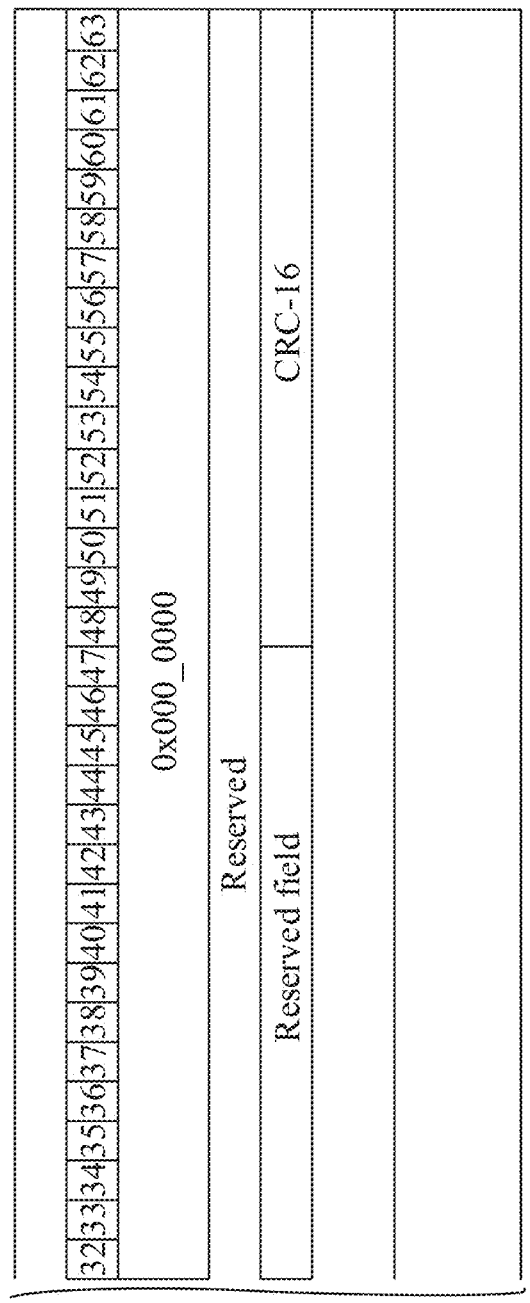

A FlexE frame is classified into a basic frame and a multiframe. A single frame includes 8 rows by 1 column of 66B overhead code blocks and 8 rows by (1023*20) columns of 66B payload code blocks, and 32 single frames form a multiframe. In a frame format of a FlexE overhead shown in FIGS. 4A and 4B, it may be learned that except some particularly specified fields, there is still some space used as a reserved field currently. Moreover, five 66B code blocks are further provided, and may be used as a management channel for delivering information other than data payloads between two FlexE devices.

Figure 5:
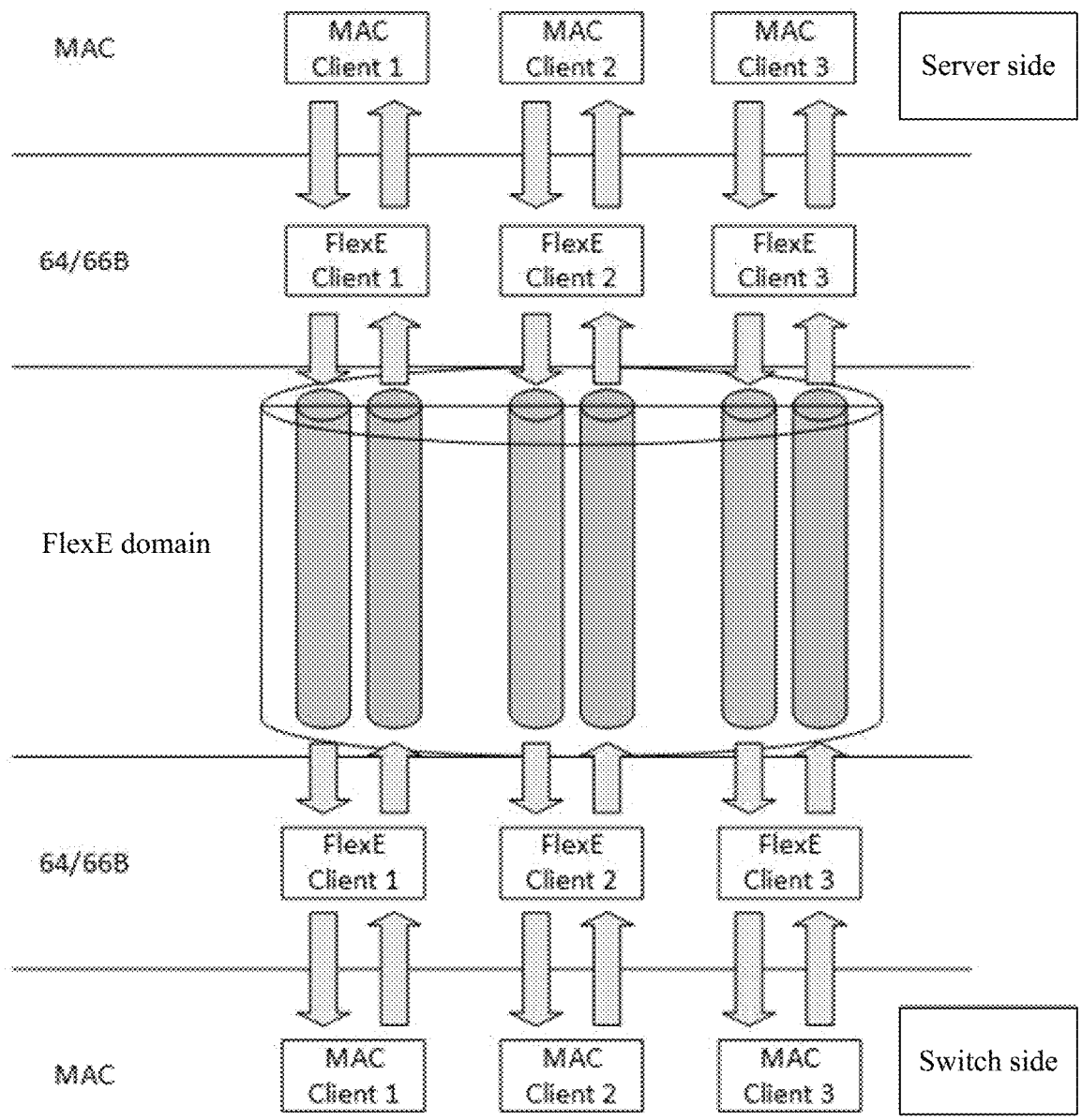
FIG. 5 is a schematic diagram of an upstream/downstream symmetric FlexE structure in some approaches.

As shown in FIG. 5, in some approaches, FlexE supports upstream/downstream symmetry, and all MAC clients (MAC client) have respective symmetric upstream and downstream FlexE clients (FlexE client). After a data packet of a MAC client is converted into a 64B/66B bit stream, the MAC client becomes a FlexE client, so that upstream data and downstream data are processed by symmetric FlexE clients, which have no interference to each other, and correspond to a corresponding MAC client.

The following describes an application scenario of this application and technical solutions in embodiments with reference to the accompanying drawings.

Figure 6:
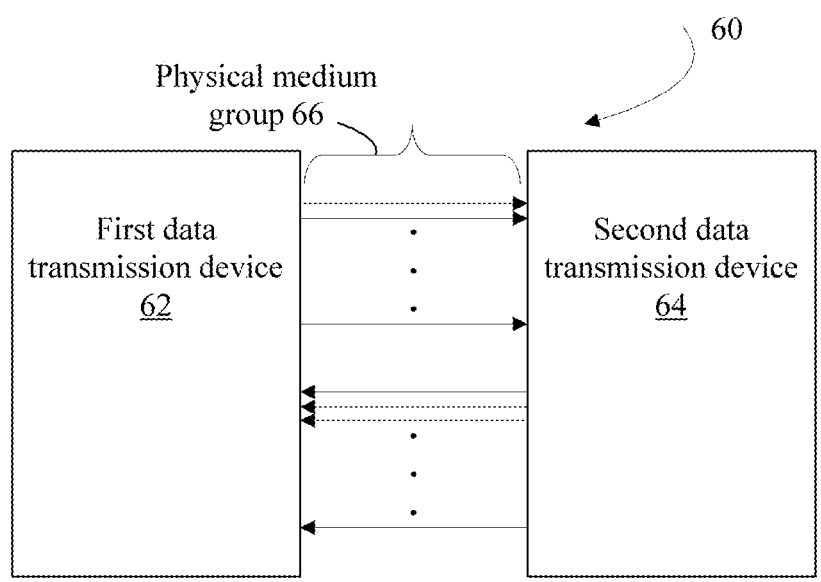
FIG. 6 is a schematic structural diagram of a data transmission system according to an embodiment of this application.

FIG. 6 is a schematic block diagram of a data transmission system 60 according to an embodiment of this application. As shown in FIG. 6, the data transmission system 60 includes a first data transmission device 62, a second data transmission device 64, and at least one physical medium that is configured to connect the first data transmission device 62 and the second data transmission device 64. The at least one physical medium forms a physical medium group 66. The first data transmission device 62 and the second data transmission device 64 may include a wide range of apparatuses, including a router, a switch, or the like. The first data transmission system 62 and the second data transmission device 64 may both be a router or a switch; or one is a router, and the other is a switch. A physical medium includes an optical fiber and other devices.

The first data transmission device 62 includes at least one MAC client, and the second data transmission device 64 includes at least one MAC client equivalent to that included in the first data transmission device 62. The first data transmission device 62 obtains first data packets, that is, upstream data, that come from different MAC clients. The different MAC clients receive, over respective second FlexE virtual links, respective second data packets sent by the second data transmission device 64, that is, downstream data. After obtaining a plurality of first data packets, the data transmission device 62 sends the plurality of first data packets to the second data transmission device 64 over a first FlexE virtual link that corresponds to the different MAC clients. Correspondingly, the second data transmission device 64 receives, over the first FlexE virtual link that corresponds to the different MAC clients, the first data packets respectively corresponding to the different MAC clients, and distributes the first data packets to the corresponding MAC clients based on first identification information of the corresponding MAC clients that is carried in the first data packets.

The first virtual link is used to transmit the first data packet, and the second virtual link is used to transmit the second data packet. Compared with the physical medium that acts as an actual transmission line, a FlexE virtual link (also referred to as a virtual pipe) is set to correspond to a plurality of slots (slots shown in FIG. 3) in one or more physical media, and the slots are the most basic elements that form the FlexE virtual pipe.

Figure 7:
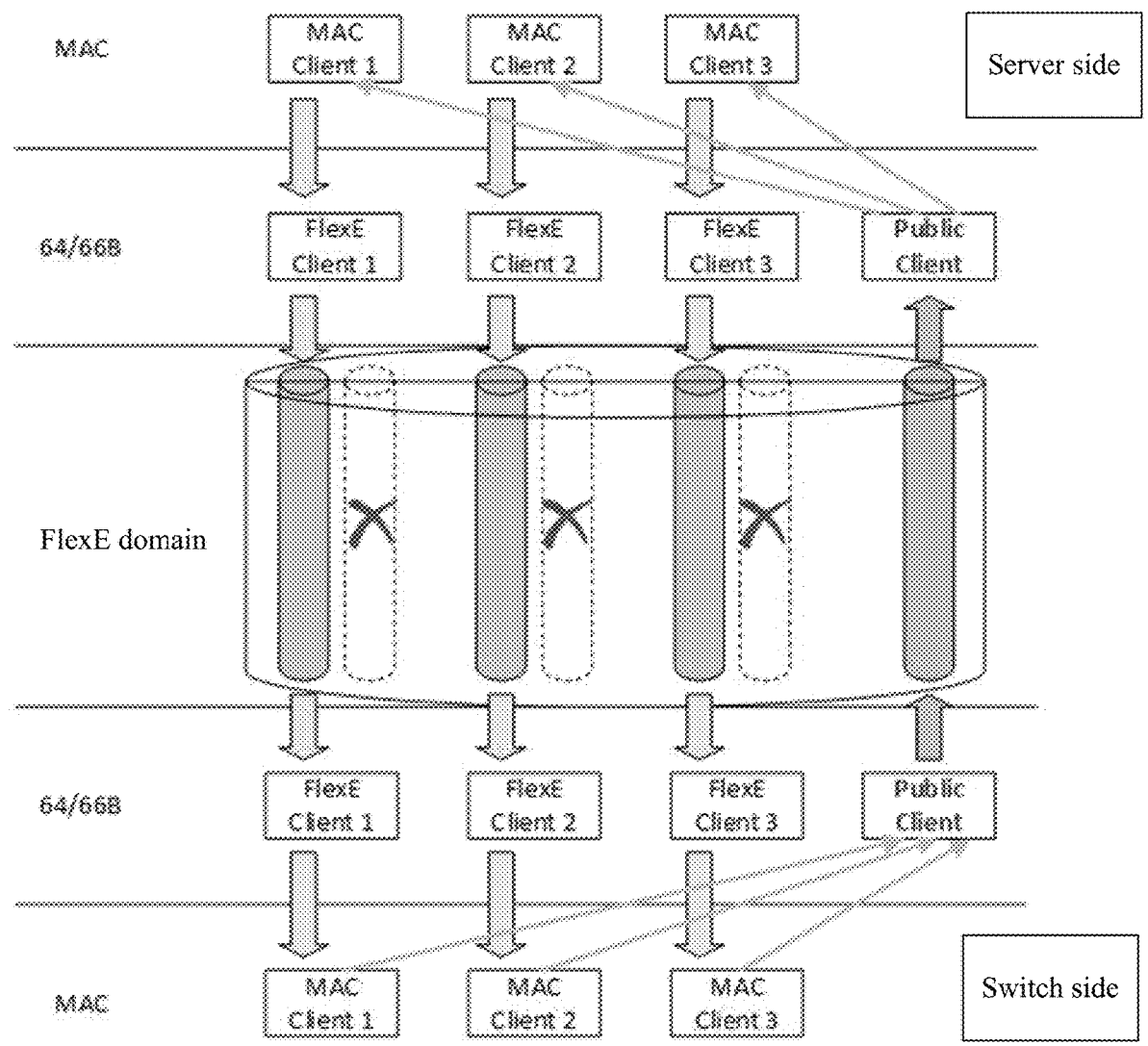
FIG. 7 is a schematic diagram of an upstream/downstream asymmetric FlexE structure according to an embodiment of this application.

In some approaches, the different MAC clients upload data by using respective different first virtual links. As shown in FIG. 5, a MAC client 1 transfers its upstream data over a first virtual link corresponding to a FlexE client 1, and a MAC client 2 transfers its upstream data over a first virtual link corresponding to a FlexE client 2. According to a data transmission method provided in this application, the different MAC clients upload data by using a same virtual link corresponding to the different MAC clients. As shown in FIG. 7, a MAC client 1, a MAC client 2, and a MAC client 3 transfer respective upstream data over a first virtual link corresponding to a FlexE public client (public client). If the shared virtual link corresponds to slot 1 to slot 10, the upstream data of the different MAC clients is transferred by using slots in a physical link that correspond to slot 1 to slot 10.

As shown in FIG. 7, in the data transmission system 60 provided in an embodiment of this application, a downstream link works properly without a change, and only an upstream link is reformed. The MAC clients no longer transmit upstream data by using respective FlexE clients, but transmit data by using a public client, and then send the data to MAC clients. The public client is an upstream fixed FlexE client in an upstream/downstream asymmetric FlexE, and a plurality of original upstream FlexE clients are multiplexed into one FlexE public client for transmission. In conclusion, according to the solution provided in this embodiment of this application, the downstream link is not changed, the original upstream link is cancelled, and all the MAC clients are connected to the FlexE public client and multiplex a same link for upstream transmission.

During an implementation, a detailed sending and receiving procedure of the upstream link in this embodiment of this application is described as follows. A plurality of MAC clients (such as the MAC client 1, the MAC client 2, and the MAC client 3) at a MAC layer at a transmit end of the upstream link transmit the upstream data to a physical coding sublayer (PCS), convert the upstream data into a 64B/66B code block format that meets a FlexE client standard, and combine the upstream data into a public client, and then the upstream data is transmitted in a FlexE domain over a first virtual link corresponding to the public client. At a receive end, the public client is converted from PCS layer 64B/66B data to MAC layer data, and then the upstream data is delivered to a corresponding MAC client.

Figure 8:
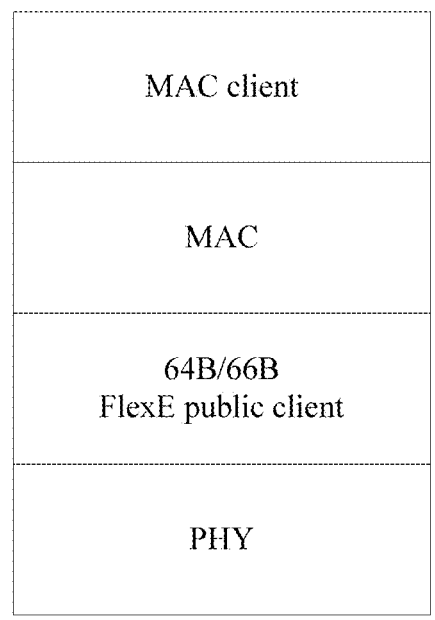
FIG. 8 is a hierarchical structural diagram of a working protocol stack according to an embodiment of this application.

As shown in FIG. 8, in an original working protocol hierarchy, the first data transmission system 62 and the second data transmission device 64 combine FlexE clients respectively corresponding to the different MAC clients into a FlexE public client.

During an implementation, all the MAC clients in the first data transmission system 62 may correspond to a same first virtual link. In such a processing manner, all the MAC clients multiplex the same first virtual link, and therefore bandwidth resources can be saved to the maximum extent.

During an implementation, alternatively, different parts of MAC clients in the data transmission system 62 may correspond to different first virtual links. For example, MAC clients 1, 2, and 3 correspond to a first virtual link 1, and MAC clients 4, 5, and 6 correspond to a first virtual link 2.

During an implementation, some MAC clients in the first data transmission system 62 may correspond to their respective dedicated first virtual links, and some MAC clients multiplex one first virtual link. For example, the MAC client 1 sends upstream data over its dedicated first virtual link 1, and the MAC clients 2 to 6 correspond to the first virtual link 2. In such a processing manner, some MAC clients use an upstream/downstream symmetric manner to transmit data, and some MAC clients use an upstream/downstream asymmetric manner to transmit data. Therefore, personalized bandwidth requirements of some MAC clients can be met; in addition, bandwidth resources of an upstream link can be saved, and physical medium costs can be reduced as much as possible.

A physical upstream data sending port on the first data transmission system 62 is connected to a physical upstream data receiving port on the second data transmission device 64 by using an optical fiber. All the MAC clients in the first data transmission system 62 correspond to the same first virtual link, and the upstream data transmitted over this virtual link is actually transmitted on the optical fiber. In such a processing manner, all the MAC clients multiplex the same physical link, and therefore physical medium costs can be reduced to the maximum extent.

Figure 9:
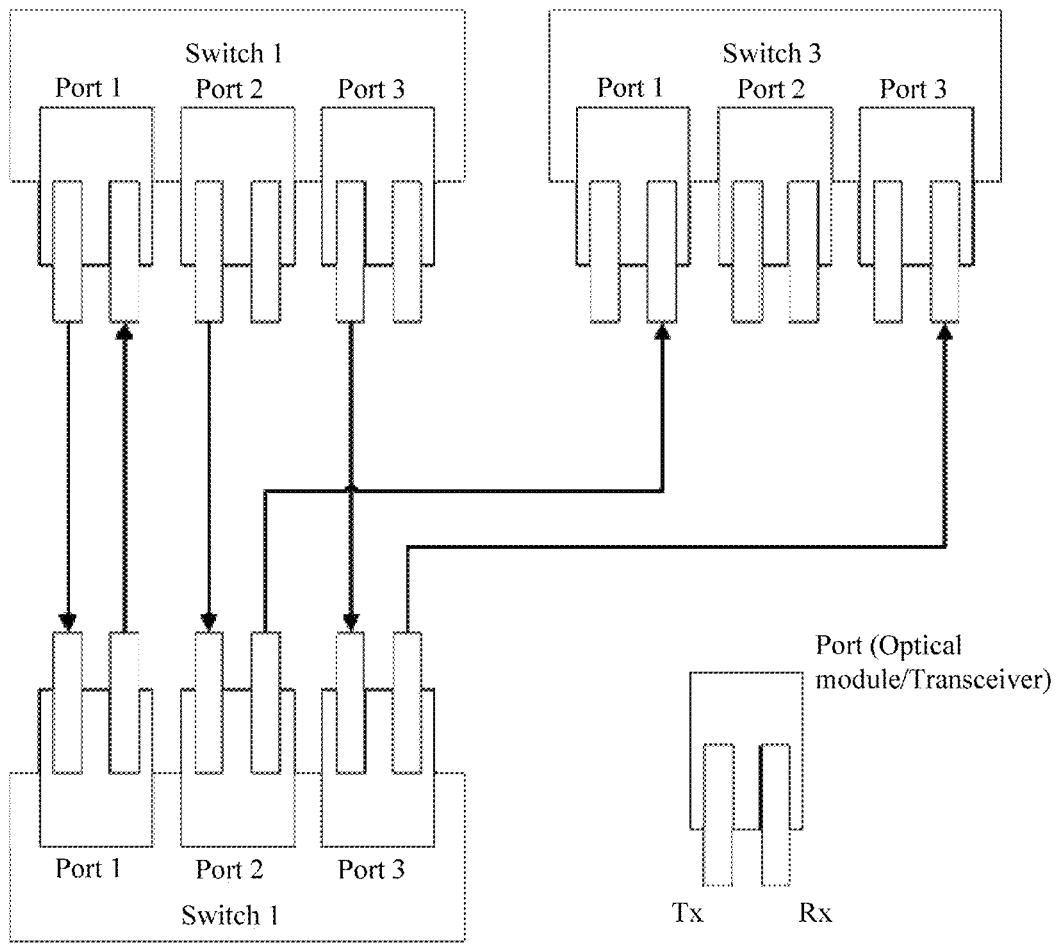
FIG. 9 is a schematic diagram of a structure of a data transmission system according to an embodiment of this application.

As shown in FIG. 9, a switch 2 is separately connected to switches 1 and 3. The switch 1 and the switch 2 form an upstream/downstream asymmetric FlexE scenario in this embodiment of this application. In addition, transmit ends of a port 2 and a port 3 on the switch 2 are connected to the switch 3, and may be used for another purpose.

By using the data transmission method provided in this embodiment of this application, FlexE data transmission in an upstream/downstream asymmetric manner can be implemented. When transmitting the downstream data, MAC clients in the second data transmission device 64 transmit data to the first data transmission device 62 over respective second virtual links, so that virtual connection transmission rates corresponding to the different MAC clients can be flexibly adjusted. When transmitting the upstream data, all the MAC clients in the first data transmission device 62 correspond to the same first virtual link, so that the different MAC clients can multiplex the first virtual link to transmit the upstream data. Therefore, bandwidth resources of an upstream link can be saved, and physical medium costs can be reduced.

Figure 10:
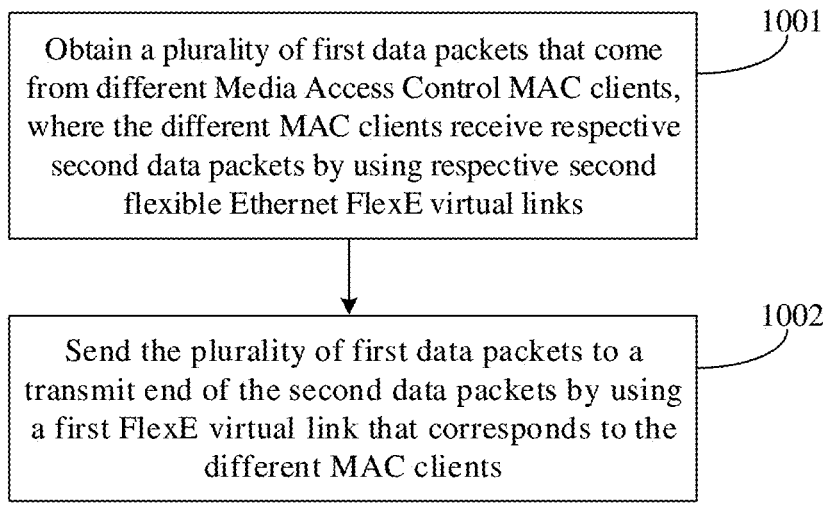
FIG. 10 is a schematic flowchart of a data transmission method according to an embodiment of this application.

The following describes an embodiment of a data transmission method in this application with reference to FIG. 10.

In part 1001, a plurality of first data packets that come from different MAC clients are obtained.

First data packets to be transmitted over a first virtual link include the plurality of first data packets that come from the different MAC clients. The different MAC clients receive respective second data packets over respective second FlexE virtual links.

The MAC client includes but is not limited to a bridge entity or a logical link control (LLC) sublayer. The LLC is defined by the IEEE 802.2 standard, and provides an interface between Ethernet MAC in a terminal protocol stack and an upper layer. The bridge entity is defined by the IEEE 802.1 standard, and provides a LAN-to-LAN interface between LANs, which can use same protocols (such as Ethernet to Ethernet) and different protocols (such as Ethernet to token ring) between each other.

In part 1002, the plurality of first data packets are sent to a transmit end of the second data packets over the first FlexE virtual link that corresponds to the different MAC clients.

During an implementation, if all the MAC clients correspond to the same first virtual link, a fixed first virtual link may be set; or if different parts of MAC clients correspond to different first virtual links, for example, MAC clients 1, 2, and 3 correspond to a first virtual link 1, and MAC clients 4, 5, and 6 correspond to a first virtual link 2, the data transmission method provided in this embodiment of this application may further include the following step of determining the first virtual link based on first identification information of a MAC client that is carried in the first data packet, and a correspondence between a MAC client identifier and a virtual link identifier.

The first identification information includes but is not limited to an identifier (such as a virtual LAN identifier (VLAN ID)) of a service flow to which the first data packet belongs. The VLAN ID is an available manner of differentiating different traffic. The VLAN ID can be used to differentiate data flows of the different MAC clients at the MAC layer, and distribute the data flows to a preset first virtual link (FlexE public client).

During an implementation, a configuration table is stored at the MAC layer, to save a mapping relationship between a VLAN ID and an identifier of the first virtual link, that is, the correspondence between a MAC client identifier and a virtual link identifier, as shown in Table

TABLE 1

Correspondence between a MAC client identifier and a virtual link identifier

| Service flow identifier (VLAN ID) | Identifier of a first virtual link (FlexE public client ID) |
|---|---|
| A, B, C | 1 |
| E, F, G | 2 |
| H | 3 |

The first identification information may also be an IP address, a MPLS identifier, or the like; or is a compound identifier formed by combining single identifiers such as a VLAN ID, an IP address, and an MPLS identifier.

It should be noted that processing on a PCS is used during an implementation, that is, a FlexE public client ID is mapped to a slot on a FlexE calendar. In other words, slot information corresponding to the first virtual link is obtained. The slot is the most basic element that forms a FlexE virtual pipe. For example, if the first virtual link corresponds to slot 1 to slot 10, upstream data is converted into a FlexE frame based on the slot information, so that the upstream data of the different MAC clients is transferred by using the slots on a physical link.

Flow control is a basic function of Ethernet, and can prevent a frame loss in the case of port congestion. According to the data transmission method provided in this embodiment of this application, when detecting that a physical data receiving port is congested, the data transmission device generates a corresponding flow control frame, for example, a pause frame or a PFC frame, for at least one MAC client that transmits data through the physical data receiving port, and sends the flow control frame to a peer device over the first virtual link.

During an implementation, a corresponding flow control frame may be generated for at least one MAC client whose physical data receiving port is congested in the following manner. For each MAC client whose physical data receiving port is congested, if PFC is not enabled for a priority of the second data packet received by the MAC client whose physical data receiving port is congested, a PAUSE frame is generated, or if PFC is enabled for a priority of the second data packet received by the MAC client whose physical data receiving port is congested, a PFC frame is generated.

It should be noted that, in an existing upstream/downstream symmetric FlexE design structure, the PAUSE frame is one flow control means. The PAUSE frame is generated at a MAC control (MAC control) sublayer of the MAC client at the transmit end of an upstream link, and after passing a respective upstream FlexE client, the PAUSE frame is sent to a corresponding MAC control at the receive end, and then the corresponding MAC client at the receive end suspends sending of downstream data, but not an entire physical port is suspended.

Figure 11:
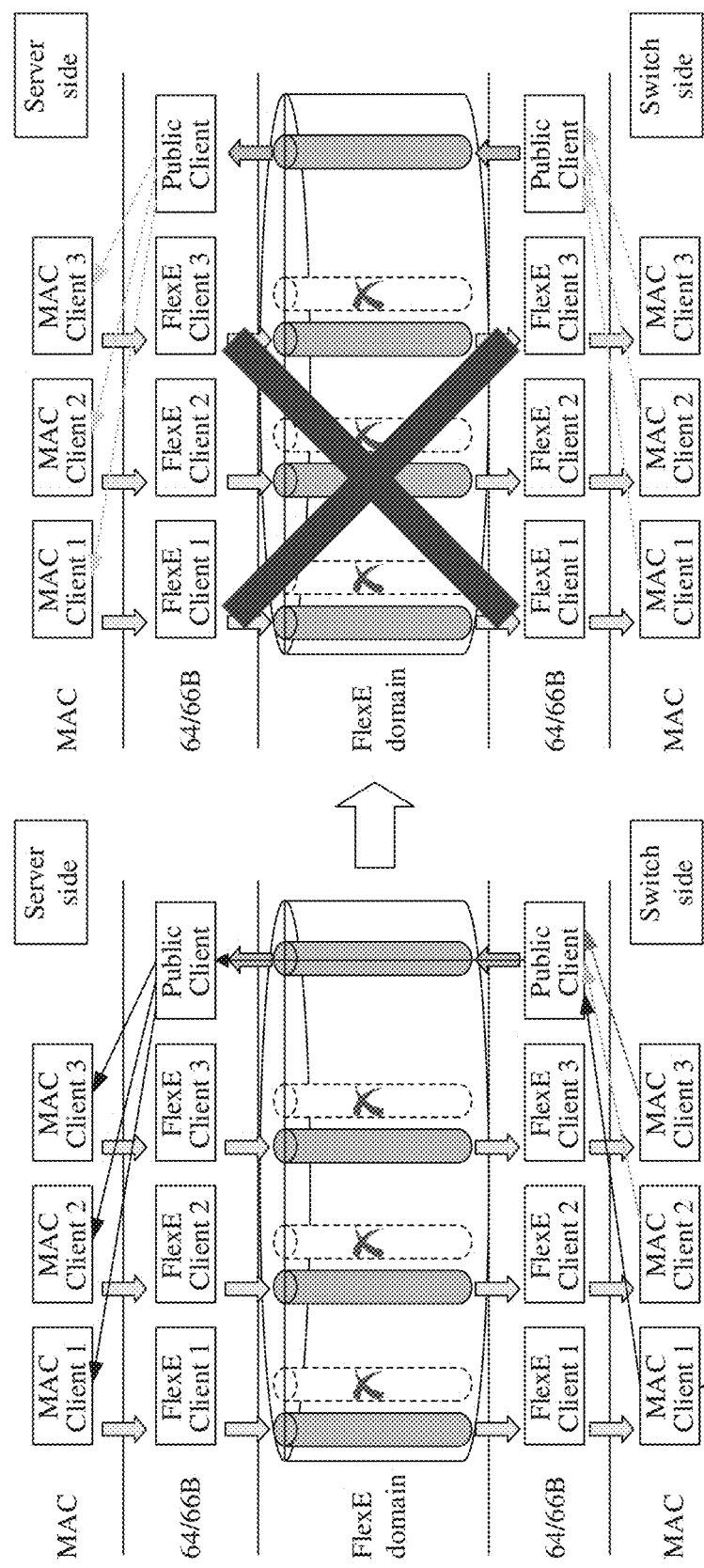
FIG. 11 is a schematic diagram of a FlexE structure in which a PAUSE frame causes sending suspension of an entire port in upstream/downstream asymmetric FlexE according to an embodiment of this application.

However, in the upstream/downstream asymmetric FlexE design structure in this embodiment of this application, PAUSE frames sent by all the MAC clients pass through a same upstream link, that is, the first virtual link. In addition, the PAUSE frame uses a multicast address, and the PAUSE frames sent by the different MAC clients cannot be differentiated. Therefore, sending of the entire physical port is suspended, and all downstream transmission is suspended and interrupted, but not sending of a specified MAC client is suspended. Details are shown in FIG. 11.

To resolve this problem, this embodiment of this application optimizes the PAUSE frame in the upstream link and its processing procedure, so that the PAUSE frame can still function in upstream/downstream asymmetric FlexE. Before part 1002, the data transmission method provided in this embodiment of this application may further include the following steps of obtaining, for each PAUSE frame, second identification information that is used to differentiate a MAC client corresponding to the PAUSE frame; and writing the second identification information into the corresponding PAUSE frame. A receive end of the PAUSE frame determines, based on the second identification information included in the PAUSE frame, a flow control apparatus that sends the PAUSE frame to the MAC client corresponding to the PAUSE frame. The flow control apparatus parses content of the PAUSE frame, extracts a control parameter from the frame, and determines, based on the control parameter, time for suspending sending.

The second identification information includes but is not limited to an identifier of a flow control apparatus that is configured to generate the PAUSE frame. The second identification information may also be an identifier of the MAC client, that is, the first identification information.

Figure 12:
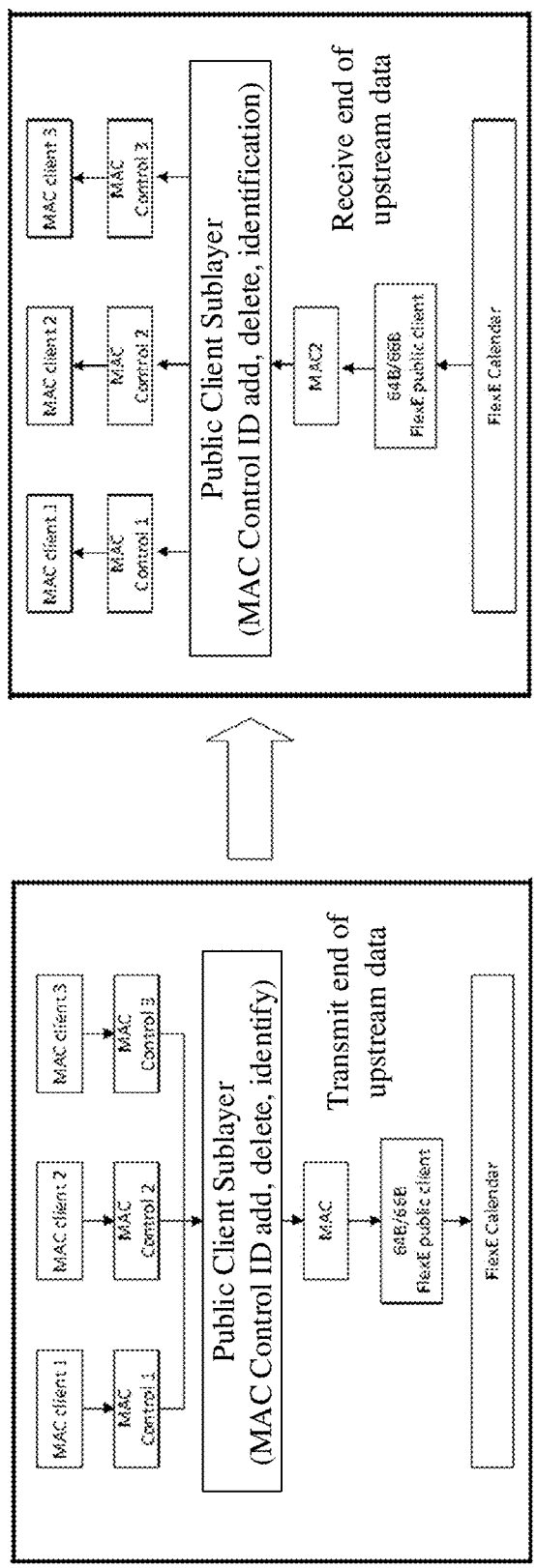
FIG. 12 is a hierarchical structural diagram of a working protocol stack in which a PAUSE frame precisely controls sending suspension of a corresponding port in upstream/downstream asymmetric FlexE according to an embodiment of this application.

During an implementation, on the basis of hierarchical division shown in FIG. 8, a flow control frame processing sublayer (public client sublayer) is added. This sublayer is responsible for identifying, modifying, and distributing a PAUSE frame. As shown in FIG. 12, at the transmit end of the upstream link, the MAC control sends the PAUSE frame to the public client sublayer to identify the PAUSE frame, writes an identifier (MAC control ID) of a flow control apparatus that generates the PAUSE frame into the PAUSE frame, and sends the PAUSE frame to MAC and then to the FlexE public client. The PAUSE frame is identified at the public client sublayer at the receive end, MAC control ID information is read from the PAUSE frame, and then the MAC control ID information may be deleted from the PAUSE frame. Then, the PAUSE frame is sent to the corresponding MAC control, so that the corresponding MAC client suspends sending. Other two MAC controls are not affected, and downstream transmission is not suspended.

Figure 13:
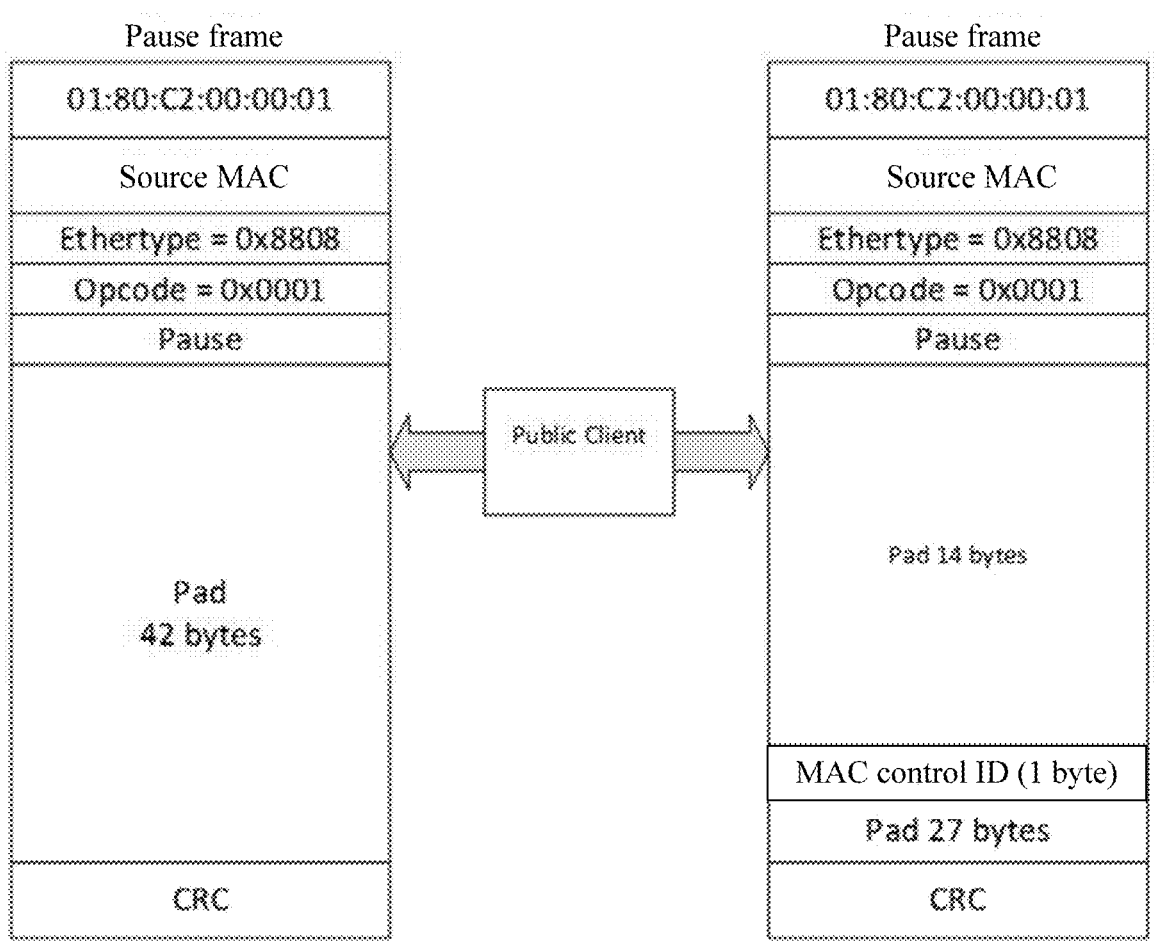
FIG. 13 is a schematic comparison diagram of a PAUSE frame before and after adjustment according to an embodiment of this application.

According to the data transmission method provided in this embodiment of this application, not only the flow control frame processing sublayer is added, but also a frame structure of the pause frame needs to be adjusted. On the basis of the original PAUSE frame, the second identification information (for example, a MAC control ID field) is inserted into a reserved field. In this embodiment, a position of the MAC control ID field is the thirty-third byte, with a length of 1 byte. In current FlexE 1.0, temporarily supported FlexE client MAC rates are 10 Gbps, 40 Gbps, and m*25 Gbps. Therefore, for a 100G PHY, a maximum of 10 MAC clients are supported. Therefore, one byte is sufficient to differentiate all MAC controls. The frame structure of the PAUSE frame before and after adjustment is shown in FIG. 13. The public client sublayer is responsible for identifying a PAUASE frame, and writing or reading the MAC control ID information into or from the PAUSE frame or modifying the MAC control ID information.

An optimized working manner of the PAUSE frame is (the MAC client 1 is used as an example) as follows. A source MAC control 1 sends the PAUSE frame; a source public client sublayer identifies the PAUSE frame, and writes a corresponding MAC control 1 into the PAUSE frame. A receive public client sublayer identifies the PAUSE frame, reads a MAC control 1 field, deletes the MAC control 1 field, and sends the PAUSE frame to the MAC control 1. A receive MAC control 1 identifies the PAUSE frame, and suspends downstream transmission of the MAC client 1. Other MAC clients work properly in the downstream.

Likewise, in the existing upstream/downstream symmetric FlexE design structure, another flow control means is a PFC frame. MAC controls of MAC clients at the transmit end of the upstream link generate PFC frames. After passing through respective upstream FlexE clients, the PFC frames are sent to corresponding MAC controls at the receive end. Then, a specified CoS in a corresponding MAC client at the receive end suspends downstream transmission, but not specified CoSs in all the MAC clients suspend downstream transmission.

Figure 14:
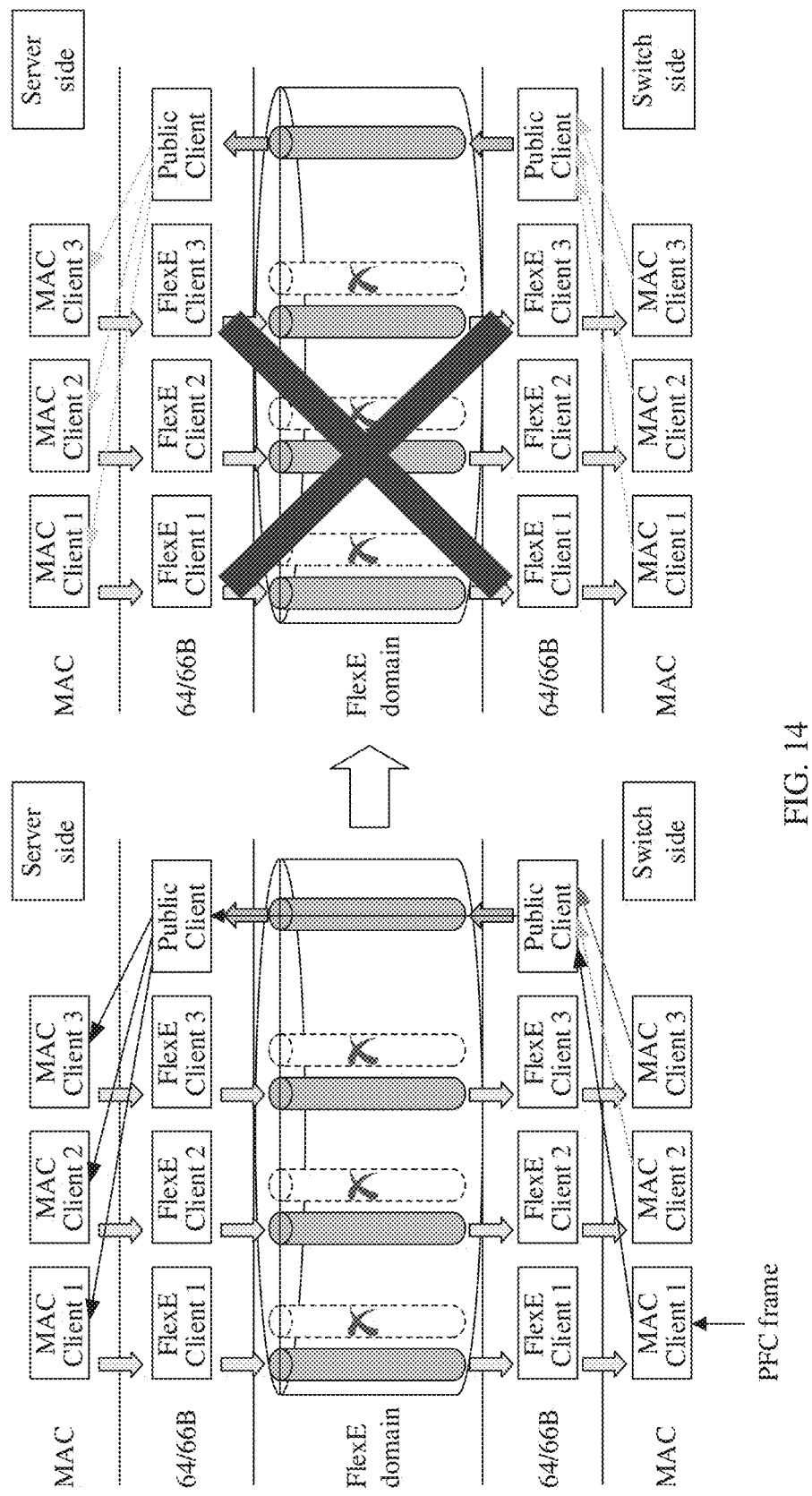
FIG. 14 is a schematic diagram of a FlexE structure in which a PFC frame causes sending suspension of specified class of services (CoSs) of an entire port in upstream/downstream asymmetric FlexE according to an embodiment of this application.

However, in the upstream/downstream asymmetric FlexE design structure in this embodiment of this application, the PFC frames sent by all the MAC clients pass through a same upstream link, that is, the FlexE public client. In addition, the PFC frame uses a multicast address, and the PFC frames sent by the different MAC clients cannot be differentiated. Therefore, sending by the specified CoSs in all the MAC clients is suspended, but sending by the specified CoS in the specified MAC client is not suspended, as shown in FIG. 14.

To resolve this problem, this embodiment of this application optimizes the PFC frame in the upstream link and its processing procedure, so that the PFC frame can still function in upstream/downstream asymmetric FlexE. Before part 1002, the data transmission method provided in this embodiment of this application may further include the following steps of obtaining, for each PFC frame, second identification information that is used to differentiate a MAC client corresponding to the PFC frame, and writing the second identification information into the corresponding PFC frame. A receive end of the PFC frame determines, based on the second identification information included in the PFC frame, a flow control apparatus that sends the PFC frame to the MAC client corresponding to the PFC frame.

Figure 15:
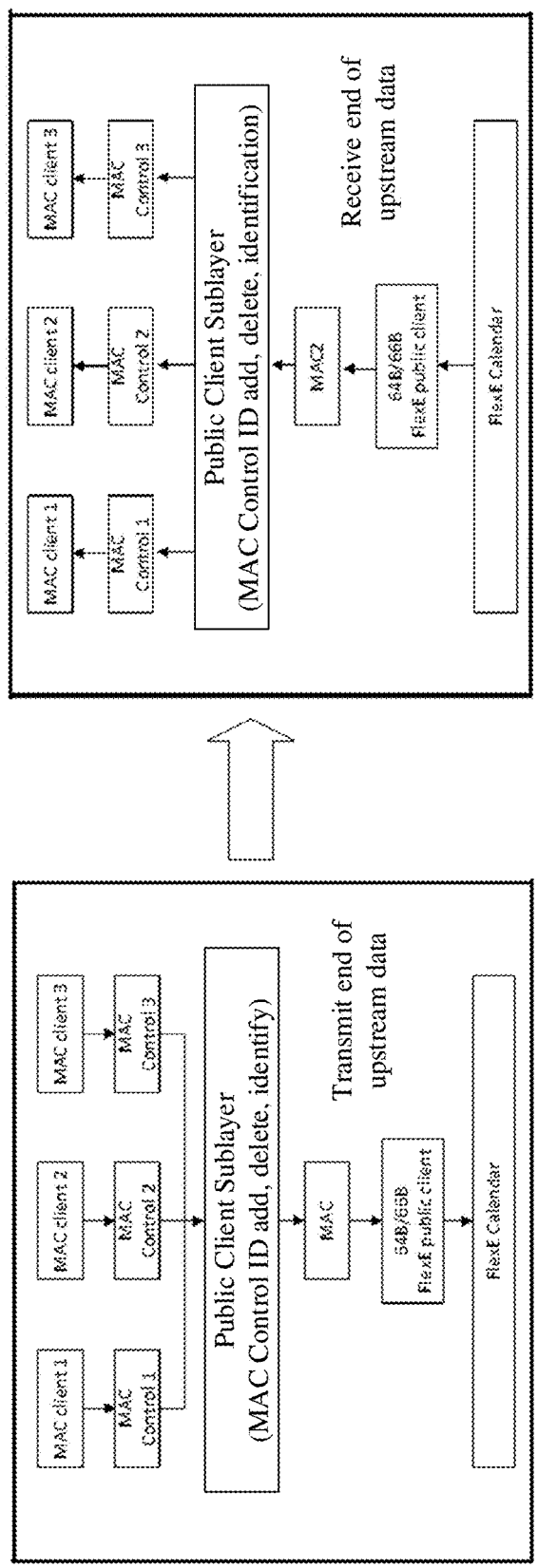
FIG. 15 is a hierarchical structural diagram of a working protocol stack in which a PFC frame precisely controls sending suspension of a specified CoS of a corresponding port in upstream/downstream asymmetric FlexE according to an embodiment of this application.

The foregoing public client sublayer is further responsible for identifying, modifying, and distributing a PFC frame. As shown in FIG. 15, at the transmit end of the upstream link, the MAC control sends the PFC frame to the public client sublayer to identify the PFC frame, writes a corresponding MAC control ID into the PFC frame, and sends the PFC frame to MAC and then to the FlexE public client. The PFC frame is identified at the public client sublayer at the receive end of the upstream link, the MAC control ID is read from the PFC frame, and then the MAC control ID information is deleted. Then, the PFC frame is sent to the corresponding MAC control, so that the specified CoS in the corresponding MAC client suspends sending. Another CoS in the same MAC client and other two MAC clients are not affected, and downstream transmission is not suspended.

Figure 16:
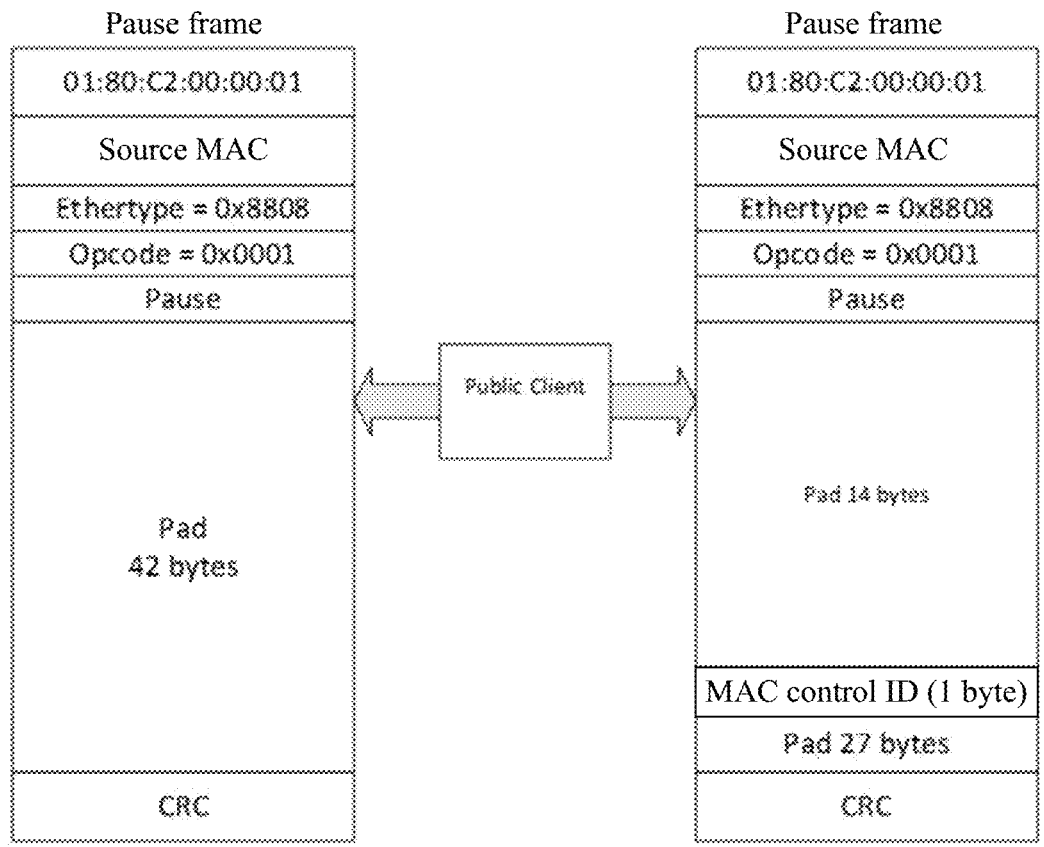
FIG. 16 is a schematic comparison diagram of a PFC frame before and after adjustment according to an embodiment of this application.

According to the data transmission method provided in this embodiment of this application, a frame structure of the PFC frame is also adjusted correspondingly. On the basis of the original PFC frame, a MAC control ID field is inserted into the reserved field. In this embodiment, a position of the field is the thirty-third byte, with a length of 1 byte. The frame structure of the PFC frame before and after adjustment is shown in FIG. 16. The public client sublayer is responsible for identifying a PFC frame, and writing or reading the MAC control ID information into or from the PFC frame or modifying the MAC control ID information.

An optimized working manner of the PFC frame is (the MAC client 1 is used as an example) is as follows. A source MAC control 1 sends the PFC frame. A source public client sublayer identifies the PFC frame, and writes corresponding MAC control 1 information into the PFC frame. A receive public client sublayer identifies the PFC frame, reads a MAC control 1 field, deletes the MAC control 1 field, and sends the PFC frame to the MAC control 1. A receive MAC control 1 identifies the PFC frame, and suspends downstream transmission of a specified CoS in the MAC client 1. Downstream transmission of another CoS in this MAC client and downstream transmission of another MAC client are normal.

In conclusion, upstream/downstream asymmetric FlexE data transmission brings about a new problem. On such an upstream link, the two control packets, the pause frame and the PFC frame, that use multicast addresses suspend the sending by all the MAC clients (or specified CoSs in all the MAC clients on a port) that correspond to an entire physical port. As a result, normal downstream transmission of another service is affected. To resolve this problem, in this embodiment of this application, the flow control frame processing sublayer (public client sublayer) is added to the MAC control (MAC control) sublayer and the MAC layer of the upstream link. This layer is used to identify, read, and modify the MAC control ID, so as to resolve the problem that the pause frame and the PFC frame cannot correctly suspend service sending in upstream/downstream asymmetric FlexE.

It may be learned from the foregoing embodiment that, according to the data transmission method provided in this embodiment of this application, a plurality of pieces of upstream data that comes from the different MAC clients can be sent to the transmit end of the downstream data over the first FlexE virtual link that corresponds to the different MAC clients. In such a processing manner, FlexE data transmission in an upstream/downstream asymmetric manner is implemented, and therefore bandwidth resources occupied by an upstream link can be effectively reduced.

Figure 17:
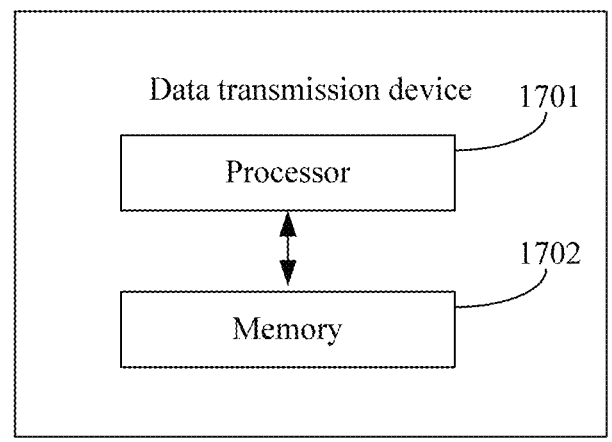
FIG. 17 is a schematic structural diagram of a data transmission device according to an embodiment of this application.

FIG. 17 shows a block diagram of the data transmission device for sending a first data packet in the foregoing embodiments.

The data transmission device includes a processor 1701 and a memory 1702. The processor 1701 performs a processing procedure related to the data transmission device in FIG. 6 to FIG. 16 and/or is configured to perform another procedure of a technology described in this application. The memory 1702 is configured to store program code and data of the data transmission device.

Optionally, the data transmission device may further include a receiver. The receiver is configured to receive a first data packet sent by another device (for example, a terminal, a server, a switch, or a router), and transfer the data packet to the processor 1701, so as to send the packet to a receive end device over a first FlexE virtual link multiplexed by different MAC clients.

It may be understood that FIG. 17 is merely a simplified design of the data transmission device. It may be understood that the data transmission device may include any quantity of processors, memories, receivers, and the like.

Corresponding to a data transmission method in this application, this application further provides a data transmission apparatus.

Figure 18:
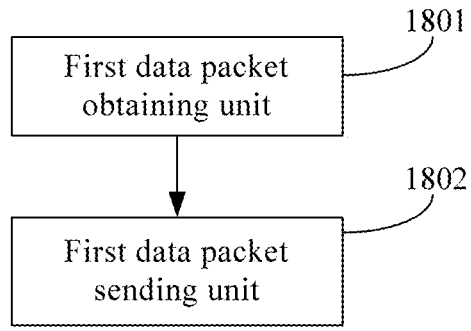
FIG. 18 is a schematic structural diagram of a data transmission apparatus according to an embodiment of this application.

As shown in FIG. 18, the data transmission apparatus includes a first data packet obtaining unit 1801 configured to obtain a plurality of first data packets that come from different Media Access Control MAC clients, where the different MAC clients receive respective second data packets over respective second flexible Ethernet FlexE virtual links and a first data packet sending unit 1802 configured to send the plurality of first data packets to a transmit end of the second data packets over a first FlexE virtual link that corresponds to the different MAC clients.

Optionally, the apparatus further includes a first virtual link determining unit configured to determine the first virtual link based on first identification information of a MAC client that is carried in the first data packet, and a correspondence between a MAC client identifier and a virtual link identifier.

Optionally, the first identification information includes an identifier of a service flow to which the first data packet belongs, an IP address, or a MPLS identifier.

Optionally, the apparatus further includes a flow control frame generation unit configured to, when it is detected that a physical data receiving port corresponding to the MAC client is congested, generate a corresponding flow control frame for at least one MAC client whose physical data receiving port is congested, and a flow control frame sending unit configured to send the flow control frame to the transmit end over the first virtual link.

Optionally, the apparatus further includes a second identification information obtaining unit configured to obtain, for each flow control frame, second identification information that is used to differentiate a MAC client corresponding to the flow control frame; and a flow control frame modification unit, configured to write the second identification information into the corresponding flow control frame.

Optionally, the second identification information includes an identifier of a flow control apparatus that is configured to generate the flow control frame.

Optionally, the flow control frame generation unit includes a flow control frame generation subunit configured to, for each MAC client whose physical data receiving port is congested, if PFC is not enabled for a priority of the second data packet received by the MAC client whose physical data receiving port is congested, generate a PAUSE frame, or if PFC is enabled for a priority of the second data packet received by the MAC client whose physical data receiving port is congested, generate a PFC frame.

Corresponding to the foregoing first data transmission method in this application, this application further provides another data transmission method.

Figure 19:
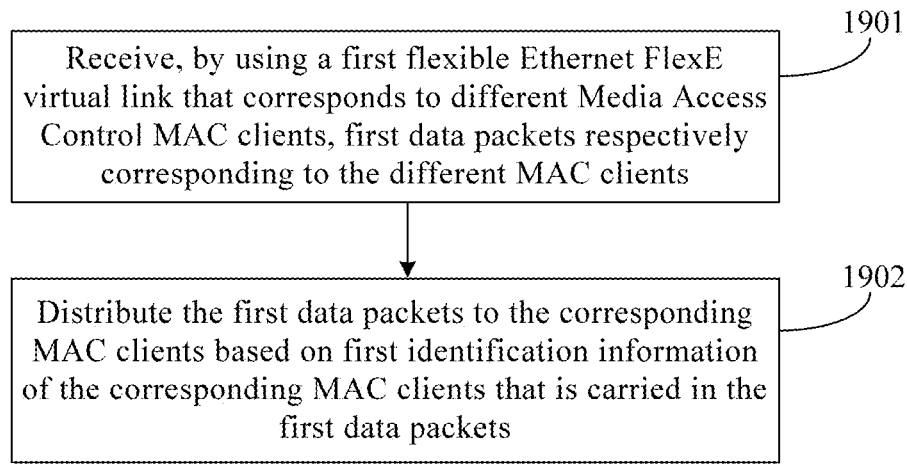
FIG. 19 is a schematic flowchart of another data transmission method according to an embodiment of this application.

The following describes an embodiment of another data transmission method in this application with reference to FIG. 19.

In part 1901, first data packets respectively corresponding to different Media Access Control MAC clients are received over a first FlexE virtual link that corresponds to the different MAC clients.

According to the data transmission method provided in this embodiment of this application, the plurality of first data packets directed to the different MAC clients are received over the first FlexE virtual link that corresponds to the different MAC clients.

In part 1902, the first data packets are distributed to the corresponding MAC clients based on first identification information of the corresponding MAC clients that is carried in the first data packets.

The first data packets include the first identification information of the MAC clients to which the packets are directed. The plurality of first data packets received over the first FlexE virtual link can be distributed to the respective MAC clients based on the first identification information of the corresponding MAC clients that is carried in the first data packets.

The first identification information includes but is not limited to an identifier of a service flow to which the first data packet belongs, an IP address, or a MPLS identifier, or may be a compound identifier formed by combining at least two of the foregoing single identifiers.

During implementation, the method may further include the following steps. (1) receiving a flow control frame over the first FlexE virtual link; (2) obtaining second identification information that is included in the flow control frame and that is used to differentiate a MAC client corresponding to the flow control frame; and (3) distributing, based on the second identification information, the flow control frame to a flow control apparatus corresponding to the corresponding MAC client.

During implementation, before the flow control frame is distributed to the flow control apparatus corresponding to the corresponding MAC client, a value of a field occupied by the second identification information in the flow control frame may be restored to a preset default value. For example, the default value is all zeros.

The second identification information includes but is not limited to an identifier of the flow control apparatus.

It may be learned from the foregoing embodiment that, according to the second data transmission method provided in this embodiment of this application, the upstream data directed to the different MAC clients can be received over the first FlexE virtual link that corresponds to the different MAC clients, and the upstream data is distributed to the corresponding MAC clients based on the first identification information that is of the corresponding MAC clients and that is carried in the upstream data. In such a processing manner, FlexE data transmission in an upstream/downstream asymmetric manner is implemented, and therefore bandwidth resources occupied by an upstream link can be effectively reduced.

Figure 20:
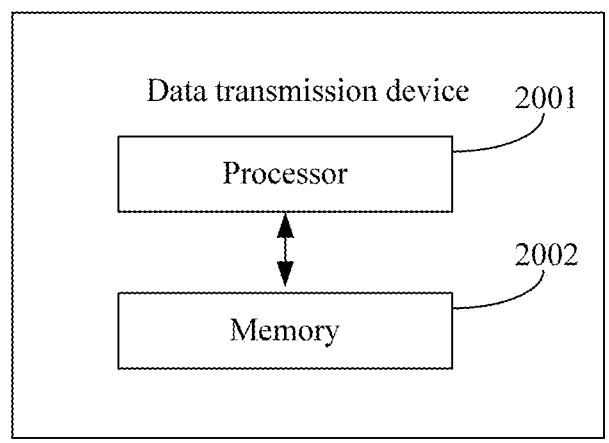
FIG. 20 is a schematic structural diagram of another data transmission device according to an embodiment of this application.

FIG. 20 shows a block diagram of the data transmission device for receiving a first data packet in the foregoing embodiments.

The data transmission device includes a processor 2001 and a memory 2002. The processor 2001 performs a processing procedure related to the data transmission device in FIG. 19 and/or is configured to perform another procedure of a technology described in this application. The memory 2002 is configured to store program code and data of the data transmission device.

It may be understood that FIG. 20 is merely a simplified design of the data transmission device. It may be understood that the data transmission device may include any quantity of processors, memories, receivers, and the like.

Corresponding to the second data transmission method in this application, this application further provides a second data transmission apparatus.

Figure 21:
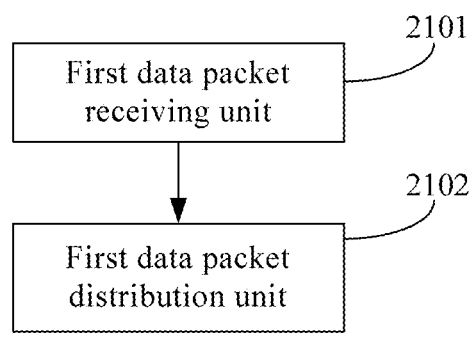
FIG. 21 is a schematic structural diagram of another data transmission apparatus according to an embodiment of this application.

As shown in FIG. 21, the data transmission apparatus includes a first data packet receiving unit 2101, configured to receive, over a first FlexE virtual link that corresponds to different MAC clients, first data packets respectively corresponding to the different MAC clients; and a first data packet distribution unit 2102 configured to distribute the first data packets to the corresponding MAC clients based on first identification information of the corresponding MAC clients that is carried in the first data packets.

Optionally, the apparatus further includes a flow control frame receiving unit configured to receive a flow control frame over the first FlexE virtual link; a second identification information obtaining unit configured to obtain second identification information that is included in the flow control frame and that is used to differentiate a MAC client corresponding to the flow control frame; and a flow control frame distribution unit configured to distribute, based on the second identification information, a modified flow control frame to a flow control apparatus corresponding to the corresponding MAC client.

Optionally, the apparatus further includes a second identification information deletion unit configured to restore a value of a field occupied by the second identification information in the flow control frame to a preset default value.

Optionally, the second identification information includes an identifier of the flow control apparatus.

Optionally, the first identification information includes an identifier of a service flow to which the first data packet belongs, an IP address, or a MPLS identifier.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

Same and similar parts between the embodiments in this specification may be mutually referenced. The embodiments of the data transmission device for sending a first data packet and the data transmission device for receiving a first data packet is basically similar to the method embodiments, and therefore are described briefly. For related parts, refer to descriptions in the method embodiments.

The foregoing descriptions are implementations of this application, but are not intended to limit the protection scope of this application.

What is claimed is:

1. A data transmission method, comprising:
    obtaining a plurality of first data packets from different Media Access Control (MAC) clients, wherein the different MAC clients are enabled to receive respective second data packets over respective flexible Ethernet (FlexE) virtual links;
    converting the first data packets into respective FlexE clients based on a F64B/66B code block format;
    sending, over a shared FlexE virtual link by the respective FlexE clients corresponding to the MAC clients, the first data packets to a transmit end associated with the second data packets;
    generating a corresponding flow control frame for at least one of the MAC clients whose physical data receiving port is congested when detecting that a first physical data receiving port that corresponds to a first MAC client of the MAC clients is congested;
    obtaining, for each flow control frame of a plurality of flow control frames, identification information that differentiates a second MAC client that corresponds to a second flow control frame from other MAC clients at the transmit end;
    writing the identification information into the second flow control frame; and
    sending the corresponding flow control frame to the transmit end over the shared FlexE virtual link.

2. The data transmission method of claim 1, further comprising determining the shared FlexE virtual link based on second identification information of a first MAC client of the different MAC clients and a correspondence between a MAC client identifier and a virtual link identifier, wherein the second identification information of the first MAC client is part of the first data packets.

3. The data transmission method of claim 2, wherein the second identification information comprises at least one of an identifier of a service flow associated with the first data packets, an Internet Protocol (IP) address, or a Multiprotocol Label Switching (MPLS) identifier.

4. The data transmission method of claim 1, wherein the second identification information comprises an identifier of a flow control apparatus that is configured to generate the second flow control frame.

5. A data transmission method, comprising:
    receiving, over a shared flexible Ethernet (FlexE) virtual link that corresponds to different Media Access Control (MAC) clients, first data packets that correspond to the different MAC clients;
    distributing the first data packets to a first MAC client of the MAC clients based on first identification information of the first MAC clients that is part of the first data packets;
    receiving a flow control frame over the shared FlexE virtual link;
    obtaining second identification information that is part of the flow control frame, wherein the second identification information differentiates a second MAC client that corresponds to the flow control frame among the MAC clients;
    restoring a value of a field occupied by the second identification information in the flow control frame to a preset default value; and
    distributing, based on the second identification information, the flow control frame to a flow control apparatus that corresponds to the second MAC client.

6. The data transmission method of claim 5, wherein the second identification information comprises an identifier of the flow control apparatus.

7. The data transmission method of claim 5, wherein the first identification information comprises at least one of an identifier of a service flow to which at least one the first data packet belongs, an Internet Protocol (IP) address, or a Multiprotocol Label Switching (MPLS) identifier.

8. A data transmission device, comprising:
    a memory comprising instructions; and
    a processor coupled to the memory and configured to execute the instructions, wherein the instructions cause the processor to be configured to:
        obtain a plurality of first data packets from a plurality of Media Access Control (MAC) clients, wherein the different MAC clients are enabled to receive respective second data packets over respective flexible Ethernet (FlexE) virtual links;
        convert the first data packets into respective FlexE clients based on a 64B/66B code block format;
        send, over a shared FlexE virtual link by the respective FlexE clients corresponding to the MAC clients, the first data packets to a transmit end associated with the second data packets;
        generate a corresponding flow control frame for at least one of the MAC clients whose physical data receiving port is congested when detecting that a first physical data receiving port that corresponds to a first MAC client of the MAC clients is congested;
        obtain, for each flow control frame of a plurality of flow control frames, identification information that differentiates a second MAC client that corresponds to a second flow control frame from other MAC clients at the transmit end;
        write the identification information into the second flow control frame; and
        send the corresponding flow control frame to the transmit end over the shared FlexE virtual link.

9. The data transmission device of claim 8, wherein the data transmission device comprises a router or a switch.

10. The data transmission device of claim 8, wherein the instructions further cause the processor to be configured to determine the shared FlexE virtual link based on second identification information of a first MAC client of the different MAC clients and a correspondence between a MAC client identifier and a virtual link identifier, and wherein the second identification information of the first MAC client is part of the first data packets.

11. The data transmission device of claim 10, wherein the second identification information comprises at least one of an identifier of a service flow associated with the first data packets, an Internet Protocol (IP) address, or a Multiprotocol Label Switching (MPLS) identifier.

12. The data transmission device of claim 8, wherein the identification information comprises an identifier of a flow control apparatus that is configured to generate the second flow control frame.

13. The data transmission device of claim 12, wherein the flow control apparatus is further configured to parse content of the PAUSE frame to extract a control parameter from the PAUSE frame.

14. The data transmission device of claim 12, wherein the identifier comprises a port number.

15. The data transmission method of claim 4, wherein the flow control apparatus is further configured to parse content of the PAUSE frame to extract a control parameter from the PAUSE frame.

16. The data transmission method of claim 4, wherein the identifier comprises a port number.

17. The data transmission method of claim 1, further comprising generating, for each of the MAC clients whose corresponding physical data receiving port is congested, a PAUSE frame when priority-based flow control (PFC) is not enabled for a priority of a second data packet of the second data packets received by a MAC client of the MAC clients whose second physical data receiving port is congested.

18. The data transmission method of claim 1, further comprising generating, for each of the MAC clients whose corresponding physical data receiving port is congested, a PFC frame when PFC is enabled for the priority of the second data packet received by the MAC client whose second physical data receiving port is congested.

19. The data transmission device of claim 8, wherein the instructions further cause the processor to be configured to generate, for each of the MAC clients whose corresponding physical data receiving port is congested, a PAUSE frame when priority-based flow control (PFC) is not enabled for a priority of a second data packet of the second data packets received by a MAC client of the MAC clients whose second physical data receiving port is congested.

20. The data transmission device of claim 8, wherein the instructions further cause the processor to be configured to generate, for each of the MAC clients whose corresponding physical data receiving port is congested, a PFC frame when PFC is enabled for the priority of the second data packet received by the MAC client whose second physical data receiving port is congested.

* * * * *

UNITED STATES PATENT AND TRADEMARK OFFICE
CERTIFICATE OF CORRECTION

PATENT NO. : 11,271,668 B2
APPLICATION NO. : 16/686665
DATED : March 8, 2022
INVENTOR(S) : Rixin Li et al.

Page 1 of 1

It is certified that error appears in the above-identified patent and that said Letters Patent is hereby corrected as shown below:

In the Claims

Claim 1, Column 19, Line 9: "a F64B/66B code" should read "a 64B/66B code"

Claim 4, Column 19, Line 43: "second identification information" should read "identification information"

Signed and Sealed this
Twenty-fourth Day of May, 2022

Katherine Kelly Vidal
*Director of the United States Patent and Trademark Office*